United States Patent
Tsukamoto et al.

(10) Patent No.: US 8,295,636 B2
(45) Date of Patent: Oct. 23, 2012

(54) GRADATION CONVERTING DEVICE, GRADATION CONVERTING METHOD, AND COMPUTER PROGRAM

(75) Inventors: Makoto Tsukamoto, Kanagawa (JP); Jun Hirai, Tokyo (JP); Ayataka Nishio, Kanagawa (JP); Naomasa Takahashi, Chiba (JP)

(73) Assignee: Sony Corporation (JP)

( * ) Notice: Subject to any disclaimer, the term of this patent is extended or adjusted under 35 U.S.C. 154(b) by 912 days.

(21) Appl. No.: 12/322,297

(22) Filed: Jan. 30, 2009

(65) Prior Publication Data

US 2009/0196525 A1  Aug. 6, 2009

(30) Foreign Application Priority Data

Feb. 1, 2008  (JP) ................ P2008-022711

(51) Int. Cl.
*G06K 9/36* (2006.01)

(52) U.S. Cl. ....... 382/274; 382/260; 382/275; 358/3.26; 358/3.27

(58) Field of Classification Search .......... 382/260, 382/274, 275; 358/3.26, 3.27, 463
See application file for complete search history.

(56) References Cited

U.S. PATENT DOCUMENTS

| | | | | |
|---|---|---|---|---|
| 5,483,361 A | * | 1/1996 | Shimizu et al. | 358/529 |
| 5,715,329 A | * | 2/1998 | Murata | 382/166 |
| 5,724,444 A | * | 3/1998 | Yamanishi | 382/168 |
| 5,870,503 A | * | 2/1999 | Kumashiro | 382/252 |
| 5,978,554 A | * | 11/1999 | Hakamada et al. | 358/1.9 |
| 6,005,596 A | * | 12/1999 | Yoshida et al. | 347/176 |
| 6,271,936 B1 | | 8/2001 | Yu et al. | |
| 6,285,800 B1 | * | 9/2001 | Yamazaki et al. | 382/266 |
| 6,510,252 B1 | | 1/2003 | Kishimoto | |
| 6,795,085 B1 | | 9/2004 | Doherty et al. | |
| 7,119,782 B2 | * | 10/2006 | Sunohara et al. | 345/100 |
| 7,277,585 B2 | * | 10/2007 | Yagishita et al. | 382/232 |
| 2003/0218778 A1 | | 11/2003 | Ohta | |

FOREIGN PATENT DOCUMENTS

| | | |
|---|---|---|
| EP | 1583358 | 10/2005 |
| JP | 04-347970 A | 12/1992 |
| JP | 10-261080 A | 9/1998 |
| JP | 11-088693 | 3/1999 |
| JP | 11-239275 A | 8/1999 |
| JP | 11-243490 A | 9/1999 |
| JP | 2003-132344 A | 5/2003 |
| JP | 2005175548 A | 6/2005 |
| JP | 2005-275733 A | 10/2005 |
| JP | 2008-542084 A | 11/2008 |
| WO | 01/31623 | 5/2001 |
| WO | 2006/131494 A1 | 12/2006 |

OTHER PUBLICATIONS

European Search Report, EP 09151506, dated May 19, 2009.

(Continued)

*Primary Examiner* — Yosef Kassa
(74) *Attorney, Agent, or Firm* — Lerner, David, Littenberg, Krumholz & Mentlik, LLP

(57) ABSTRACT

A gradation converting device that converts gradation of an image includes: a dither unit that applies dither to the image by adding random noise to a pixel value forming the image; and a one-dimensional $\Delta\Sigma$ modulation unit that applies one-dimensional $\Delta\Sigma$ modulation to the image applied with the dither.

14 Claims, 16 Drawing Sheets

OTHER PUBLICATIONS

Bernard T M ED—Vandewalle U et al., Signal Processing Theories and Applications. Brussels, Aug. 24-27, 1992; [Proceedings of the European Signal Processing Conference (EUSIPCO)], Amsterdam, Elsevier, NL, 3; 1465-1468 (1992).

Anastassiou D, IEEE Transactions on Circuits and Systems, IEEE Inc. New York, US, 36(9); 1175-1186 (1989).

Bernard T M ED, Speech Processing 1. San Francisco, Mar. 23-26, 1992; [Proceedings of the International Conference on Acoustics, Speech and Signal Processing (ICASSP)], New York, IEEE, US, 3; 197-200 (1992).

Kite T D et al., Image Processing, 1997. Proceedings.,International Conference on Santa Barbara, CA, USA Oct. 26-29, 1997, Los Alamitos, CA, USA, IEEE Comput. Soc, US, 1; 799-802 (1997).

Office Action from Japanese Application No. 2008-247291 dated Jun. 24, 2012.

* cited by examiner

GRADATION CONVERTING DEVICE, GRADATION CONVERTING METHOD, AND COMPUTER PROGRAM

CROSS-REFERENCES TO RELATED APPLICATIONS

The present application claims priority from Japanese Patent Application No. JP 2008-022711, filed in the Japanese Patent Office on Feb. 1, 2008, the entire content of which is incorporated herein by reference.

BACKGROUND OF THE INVENTION

1. Field of the Invention

The present invention relates to a gradation converting device, a gradation converting method, and a computer program, and, more particularly to a gradation converting device, a gradation converting method, and a computer program that can realize, for example, a reduction in size and a reduction in cost of the device.

2. Description of the Related Art

For example, to display an image of an N-bit pixel value (hereinafter also referred to as N-bit image) in a display device that displays an image of an M-bit pixel value smaller than the N-bit pixel value, it is necessary to convert the N-bit image into the M-bit image, i.e., perform gradation conversion for converting the gradation of the image.

As a method of gradation-converting the N-bit image into the M-bit image (a gradation converting method), for example, there is a method of omitting lower N-M bits of the N-bit pixel value to convert the N-bit pixel value into the M-bit pixel value.

The gradation converting method for omitting the lower N-M bits of the N-bit pixel value and converting the N-bit pixel value into the M-bit pixel value is explained below with reference to FIGS. 1A and 1B and FIGS. 2A and 2B.

FIGS. 1A and 1B are diagrams of an 8-bit image of a gray scale and a pixel value on a certain horizontal line of the image.

FIG. 1A is a diagram of the 8-bit image of the gray scale.

In the image shown in FIG. 1A, pixel values gradually change from 100 to 200 from the left to the right in the horizontal direction. The same pixel values are arranged in the vertical direction.

FIG. 1B is a diagram of a pixel value on a certain horizontal line of the image shown in FIG. 1A.

In FIG. 1A, a pixel value at the left end is 100 and pixel values are larger further on the right side. A pixel value at the right end is 200.

FIGS. 2A and 2B are diagrams of a 4-bit image formed by omitting lower 4 bits of the 8-bit image shown in FIG. 1A and a pixel value on a certain horizontal line of the image.

FIG. 2A is a diagram of an image formed by quantizing the 8-bit image shown in FIG. 1A into 4 bits by omitting the lower 4 bits of the 8-bit image. FIG. 2B is a diagram of a pixel value on a certain horizontal line of the image.

$256 (=2^8)$ gradations can be represented by 8 bits. However, only $16 (=2^4)$ bits can be represented by 4 bits. Therefore, in the gradation conversion for omitting the lower 4 bits of the 8-bit image, banding in which a change in gradations looks like a band occurs.

There are a random dither method, an ordered dither method, and an error diffusion method as a gradation converting method for preventing such banding from occurring and simulatively representing the gradation of an image before the gradation conversion in an image after the gradation conversion, i.e., for example, a method of visually representing, in a 16-gradation image obtained by gradation-converting a 256-gradation image as explained above, 256 gradations in 16 gradations when a person looks at the image.

FIGS. 3A and 3B are diagrams for explaining the random dither method.

FIG. 3A is a diagram of a configuration example of a gradation converting device in the past that performs gradation conversion by the random dither method. FIG. 3B is a diagram of an image of a gray scale obtained by the gradation conversion by the gradation converting device shown in FIG. 3A.

In FIG. 3A, the gradation converting device includes an arithmetic unit 11, a random-noise output unit 12, and a quantizing unit 13.

For example, a pixel value IN(x,y) of each pixel (x,y) of an 8-bit image is supplied to the arithmetic unit 11 in raster scan order as an image to be subjected to the gradation conversion (an image before the gradation conversion). The pixel (x,y) represents a pixel xth from the left and yth from the top.

Random noise outputted from the random-noise output unit 12, which generates and outputs random noise, is also supplied to the arithmetic unit 11.

The arithmetic unit 11 adds up the pixel value IN(x,y) and the random noise outputted from the random-noise output unit 12 and supplies an added-up value obtained as a result of the addition to the quantizing unit 13.

The quantizing unit 13 quantizes the added-up value supplied from the arithmetic unit 11 into, for example, 4 bits and outputs a 4-bit quantized value obtained as a result of the quantization as a pixel value OUT(x,y) of the pixel (x,y) of an image after the gradation conversion.

In the random dither method, the configuration of the gradation converting device is simplified. However, since the random noise is added to the pixel value IN(x,y), noise is conspicuous in the image after the gradation conversion as shown in FIG. 3B. Therefore, it is difficult to obtain a high-quality image.

FIGS. 4A and 4B are diagrams for explaining the ordered dither method.

FIG. 4A is a diagram of a configuration example of a gradation converting device in the past that performs gradation conversion by the ordered dither method. FIG. 4B is a diagram of an image of a gray scale obtained by the gradation conversion by the gradation converting device shown in FIG. 4A.

In FIG. 4A, the gradation converting device includes an arithmetic unit 21 and a quantizing unit 22.

For example, a pixel value IN(x,y) of each pixel (x,y) of an 8-bit image is supplied to the arithmetic unit 21 in raster scan order as an image to be subjected to the gradation conversion.

A dither matrix is also supplied to the arithmetic unit 21.

The arithmetic unit 21 adds up the pixel value IN(x,y) and a value of a random matrix corresponding to a position (x,y) of the pixel (x,y) having the pixel value IN(x,y) and supplies an added-up value obtained as a result of the addition to the quantizing unit 22.

The quantizing unit 22 quantizes the added-up value supplied from the arithmetic unit 21 into, for example, 4 bits and outputs a 4-bit quantized value obtained as a result of the quantization as a pixel value OUT(x,y) of a pixel (x,y) of an image after the gradation conversion.

With the ordered dither method, compared with the random dither method, it is possible to improve a quality of the image after the gradation conversion. However, as shown in FIG. 4B, a pattern of the dither matrix may appear in the image after the gradation conversion.

FIGS. 5A and 5B are diagrams for explaining the error diffusion method.

FIG. 5A is a diagram of a configuration example of a gradation converting device in the past that performs gradation conversion by the error diffusion method. FIG. 5B is a diagram of an image of a gray scale obtained by the gradation conversion by the gradation converting device shown in FIG. 5A.

In FIG. 5A, the gradation converting device includes an arithmetic unit 31, a quantizing unit 32, an arithmetic unit 33, and a two-dimensional filter 34.

For example, a pixel value IN(x,y) of each pixel (x,y) of an 8-bit image is supplied to the arithmetic unit 31 in raster scan order as an image to be subjected to the gradation conversion.

An output of the two-dimensional filter 34 is supplied to the arithmetic unit 31.

The arithmetic unit 31 adds up the pixel value IN(x,y) and the output of the two-dimensional filter 34 and supplies an added-up value obtained as a result of the addition to the quantizing unit 32 and the arithmetic unit 33.

The quantizing unit 32 quantizes the added-up value supplied from the arithmetic unit 31 into, for example, 4 bits and outputs a 4-bit quantized value obtained as a result of the quantization as a pixel value OUT(x,y) of the pixel (x,y) of an image after the gradation conversion.

The pixel value OUT(x,y) outputted by the quantizing unit 32 is supplied to the arithmetic unit 33 as well.

The arithmetic unit 33 subtracts the pixel value OUT(x,y) supplied from the quantizing unit 32 from the added-up value supplied from the arithmetic unit 31, i.e., subtracts the output from the quantizing unit 32 from the input to the quantizing unit 32 to calculate a quantization error −Q(x,y) caused by the quantization in the quantizing unit 32. The arithmetic unit 33 supplies the quantization error −Q(x,y) to the two-dimensional filter 34.

The two-dimensional filter 34 is a two-dimensional filter for filtering a signal. The two-dimensional filter 34 filters the quantization error −Q(x,y) supplied from the arithmetic unit 33 and outputs a result of the filtering to the arithmetic unit 31.

The arithmetic unit 31 adds up the result of the filtering of the quantization error −Q(x,y) outputted by the two-dimensional filter 34 as explained above and the pixel value IN(x,y).

In the gradation converting device shown in FIG. 5A, the quantization error −Q(x,y) is fed back to the input side (the arithmetic unit 31) via the two-dimensional filter 34. The gradation converting device configures a two-dimensional ΔΣ modulator.

With the two-dimensional ΔΣ modulator explained above, the quantization error −Q(x,y) is diffused to a high-frequency band of a spatial frequency in both the horizontal direction (the x direction) and the vertical direction (the y direction) (noise shaping). As a result, as shown in FIG. 5B, as an image after the gradation conversion, a high-quality image can be obtained compared with those obtained by the random noise method and the ordered dither method.

A method of performing gradation conversion into a high-quality image using the two-dimensional ΔΣ modulator is disclosed in detail in Japanese Patent No. 3959698.

SUMMARY OF THE INVENTION

As explained above, with the two-dimensional ΔΣ modulator, gradation conversion into a high-quality image can be performed.

However, as shown in FIG. 5A, the two-dimensional ΔΣ modulator has the two-dimensional filter 34. Therefore, in the two-dimensional filter 34, line memories for storing quantization errors outputted in the past by the arithmetic unit 33 and used for the filtering are necessary.

When attention is paid to a certain pixel (x,y) as a pixel of attention (x,y), the two-dimensional filter 34 applies, using quantization errors already obtained, the filtering of the quantization error −Q(x,y) of the pixel of attention (x,y) to plural pixels that are present on a horizontal line (yth line) same as a horizontal line of the pixel of attention (x,y) and located in positions close to the pixel of attention (x,y) and plural pixels that are present on a horizontal line (e.g., a y−1th line or a y−2th line) above the pixel of attention (x,y) and located in positions close to the pixel of attention (x,y).

Therefore, the two-dimensional filter 34 needs to store, besides the quantization errors of the pixels present on the yth line same as the horizontal line of the pixel of attention (x,y), quantization errors of pixels on horizontal lines other than the yth line. For this purpose, line memories equivalent to the plural horizontal lines are necessary.

As explained above, the line memories equivalent to the plural horizontal lines are necessary in the two-dimensional filter 34. Therefore, the gradation converting device shown in FIG. 5A configured as the two-dimensional ΔΣ modulator is increased in size and cost.

Therefore, it is desirable to make it possible to perform, without using line memories, gradation conversion, with which a high-quality image can be obtained, to thereby realize a reduction in size and a reduction in cost of a gradation converting device.

According to an embodiment of the present invention, there is provided a gradation converting device that converts the gradation of an image, the gradation converting device including: dither means for applying dither to the image by adding random noise to a pixel value forming the image; and one-dimensional ΔΣ modulation means for applying one-dimensional ΔΣ modulation to the image applied with the dither or there is provided a computer program for causing the computer to function as the gradation converting device.

According to another embodiment of the present invention, here is provided a gradation converting method for a gradation converting device that converts the gradation of an image, the gradation converting method including the steps of: the gradation converting device applying dither to the image by adding random noise to a pixel value forming the image; and the gradation converting device applying one-dimensional ΔΣ modulation to the image applied with the dither.

According to the embodiments of the present invention, the dither is applied to the image by adding the random noise to the pixel value forming the image and the one-dimensional ΔΣ modulation is applied to the image applied with the dither.

The gradation converting device may be an independent device or may be an internal block that configures one device.

The computer program can be provided by being transmitted through a transmission medium or being recorded in a recording medium.

According to the embodiments of the present invention, it is possible to perform gradation conversion. In particular, it is possible to perform, without using line memories, gradation conversion with which a high-quality image can be obtained.

DESCRIPTION OF THE PREFERRED EMBODIMENTS

Figure 6:
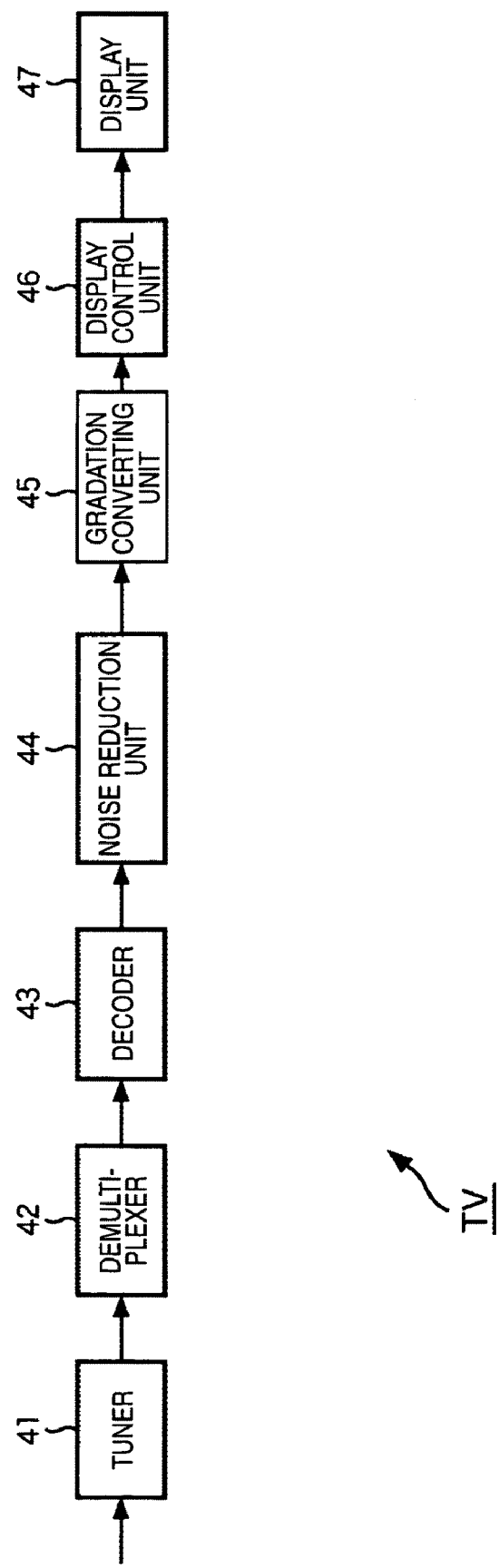
FIG. 6 is a block diagram of a configuration example of a television receiver (TV) according to a first embodiment of the present invention.

FIG. 6 is a block diagram of a configuration example of a television receiver (TV) according to an embodiment of the present invention.

In FIG. 6, the TV includes a tuner 41, a demultiplexer 42, a decoder 43, a noise reduction unit 44, a gradation converting unit 45, a display control unit 46, and a display unit 47.

The tuner 41 receives, for example, a broadcast signal of a digital broadcast, demodulates a transport stream from the broadcast signal, and supplies the transport stream to the demultiplexer 42.

The demultiplexer 42 separates a necessary TS (Transport Stream) packet from the transport stream supplied from the tuner 41 and supplies the TS packet to the decoder 43.

The decoder 43 decodes MPEG (Moving Picture Expert Group)-encoded data included in the TS packet supplied from the demultiplexer 42 to thereby obtain, for example, an 8-bit image (data) and supplies the 8-bit image to the noise reduction unit 44.

The noise reduction unit 44 applies noise reduction processing to the 8-bit image supplied from the decoder 43 and supplies, for example, 12-bit image obtained as a result of the noise reduction processing to the gradation converting unit 45.

In other words, according to the noise reduction processing by the noise reduction unit 44, the 8-bit image is expanded to the 12-bit image.

The gradation converting unit 45 performs gradation conversion for converting the 12-bit image supplied from the noise reduction unit 44 into an image having the number of bits that the display unit 47 can display.

The gradation converting unit 45 acquires, from the display control unit 46, the number of bits of the image that the display unit 47 can display and other necessary information.

When the number of bits of the image that the display unit 47 can display is, for example, 8 bits, the gradation converting unit 45 gradation-converts the 12-bit image supplied from the noise reduction unit 44 into an 8-bit image and supplies the 8-bit image to the display control unit 46.

The display control unit 46 controls the display unit 47 to display the image supplied from the gradation converting unit 45.

The display unit 47 includes, for example, an LCD (Liquid Crystal Display) or an organic EL (organic Electro Luminescence) and displays an image under the control by the display control unit 46.

Figure 7:
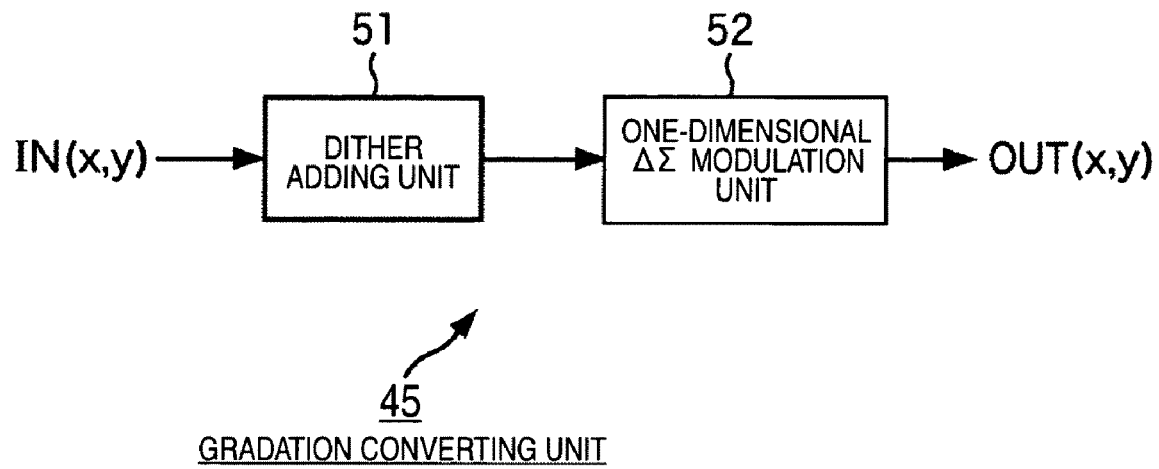
FIG. 7 is a block diagram of a configuration example of a modulation converting unit 45.

FIG. 7 is a diagram of a configuration example of the gradation converting unit 45 shown in FIG. 6.

In FIG. 7, the gradation converting unit 45 includes a dither adding unit 51 and a one-dimensional $\Delta\Sigma$ modulation unit 52. The gradation converting unit 45 applies gradation conversion processing to the image supplied from the noise reduction unit 44 (FIG. 6) and supplies the image to the display control unit 46 (FIG. 6).

The image supplied from the noise reduction unit 44 (FIG. 6) is supplied to the dither adding unit 51 as an image to be subjected to gradation conversion (hereinafter also referred to as target image).

The dither adding unit 51 adds random noise to a pixel value IN(x,y) forming the target image supplied from the noise reduction unit 44 to thereby apply dither to the target image and supplies the target image to the one-dimensional $\Delta\Sigma$ modulation unit 52.

The one-dimensional $\Delta\Sigma$ modulation unit 52 applies one-dimensional $\Delta\Sigma$ modulation to the target image applied with the dither, which is supplied from the dither adding unit 51, and supplies an image formed by a pixel value OUT(x,y) obtained as a result of the one-dimensional $\Delta\Sigma$ modulation to the display control unit 46 (FIG. 6).

Figure 8:
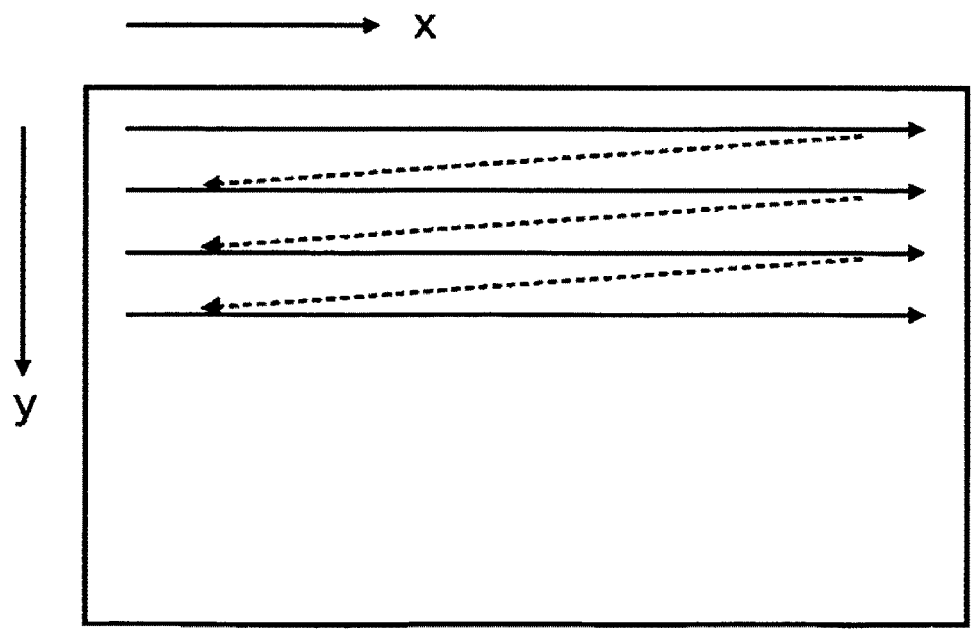
FIG. 8 is a diagram for explaining order of pixels (pixel values) to be subjected to gradation conversion processing.

FIG. 8 is a diagram of order of pixels (pixel values) to be subjected to the gradation conversion processing in the gradation converting unit 45 shown in FIG. 7.

The noise reduction unit 44 (FIG. 6) supplies the pixel value IN(x,y) of the pixel (x,y) of the target image to the modulation converting unit 45 in raster scan order, for example, as shown in FIG. 8. Therefore, the gradation modulating unit 45 sets the pixel value IN(x,y) of the pixel (x,y) of the target image as a target of the gradation conversion processing in raster scan order.

Figure 9:
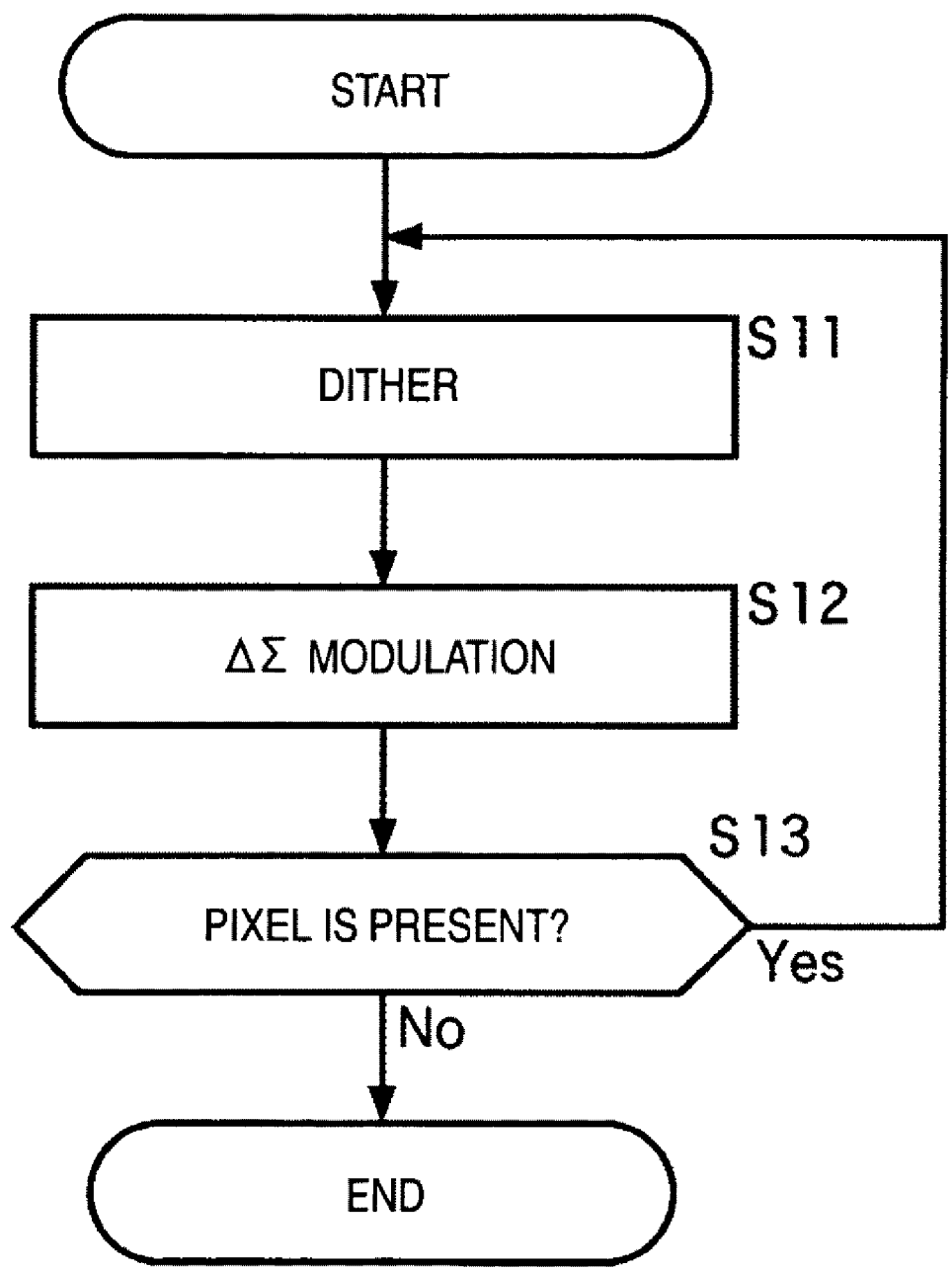
FIG. 9 is a flowchart for explaining the gradation conversion processing.

The gradation conversion processing performed by the gradation converting unit 45 as shown in FIG. 8 is explained with reference to a flowchart shown in FIG. 9.

In the gradation conversion processing, the dither adding unit 51 waits for the pixel value IN(x,y) of the target image to be supplied from the noise reduction unit 44 (FIG. 6). In step S11, the dither adding unit 51 applies, to the pixel value IN(x,y), dither for adding random noise thereto and supplies the pixel value IN(x,y) to the one-dimensional ΔΣ modulation unit 52. The processing proceeds to step S12.

In step S12, the one-dimensional ΔΣ modulation unit 52 applies the one-dimensional ΔΣ modulation to the pixel value applied with the dither, which is supplied from the dither adding unit 51, and supplies the pixel value OUT(x,y) obtained as a result of the one-dimensional ΔΣ modulation to the display control unit 46 (FIG. 6) as a pixel value of an image after gradation conversion. The processing proceeds to step S13.

In step S13, the gradation modulating unit 45 determines whether there is the pixel value IN(x,y) supplied from the noise reduction unit 44. When it is determined that there is the pixel value IN(x,y) supplied from the noise reduction unit 44, the processing returns to step S11. Thereafter, the same processing is repeated.

When it is determined in step S13 that there is no pixel value IN(x,y) supplied from the noise reduction unit 44, the gradation conversion processing ends.

Figure 10A:
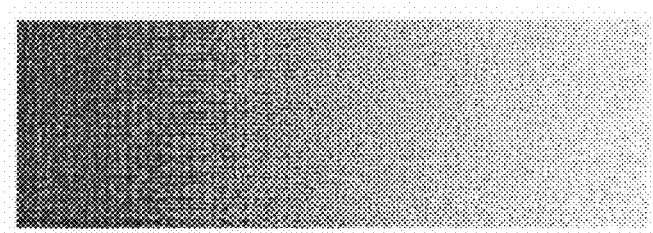
FIGS. 10A and 10B are diagrams of an image obtained by gradation conversion by the gradation converting unit 45 and a pixel value on a certain horizontal line of the image.
Figure 10B:
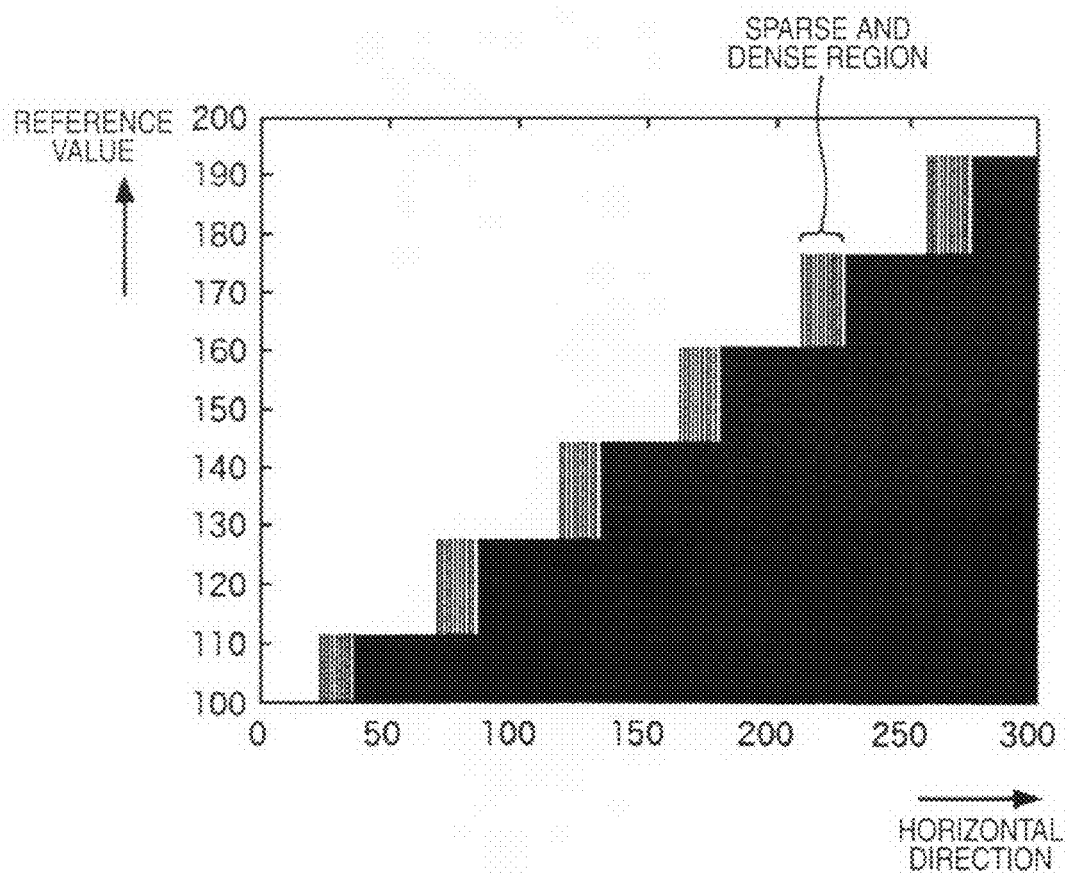

FIGS. 10A and 10B are diagrams of an image obtained by the gradation conversion by the gradation converting unit 45 and a pixel value on a certain horizontal line of the image.

Figure 1A:
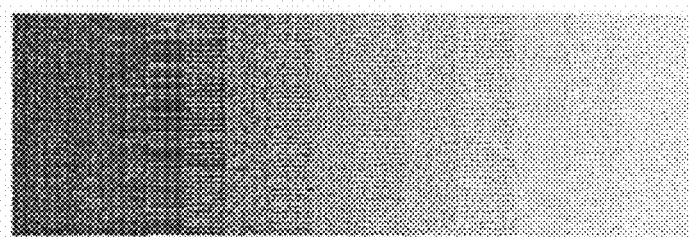
FIGS. 1A and 1B are diagrams of an 8-bit image of a gray scale and a pixel value on a certain horizontal line of the image.
Figure 1B:
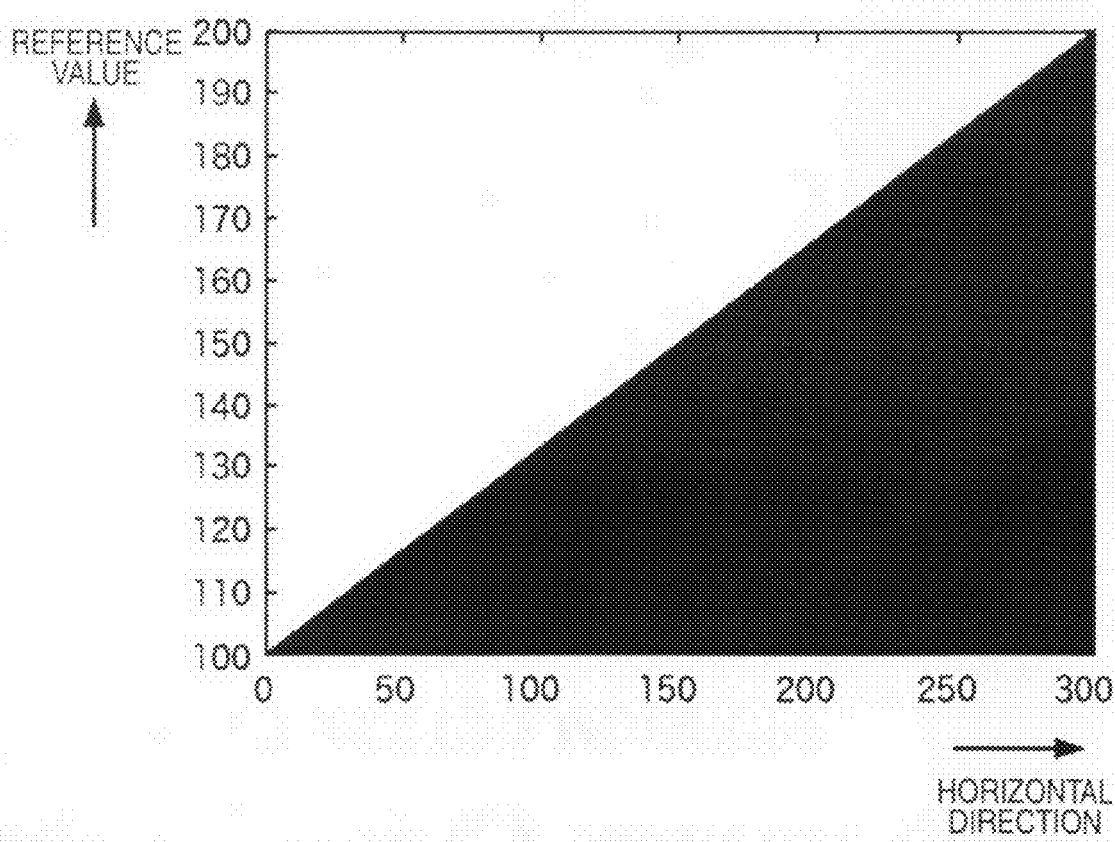
Figure 2A:
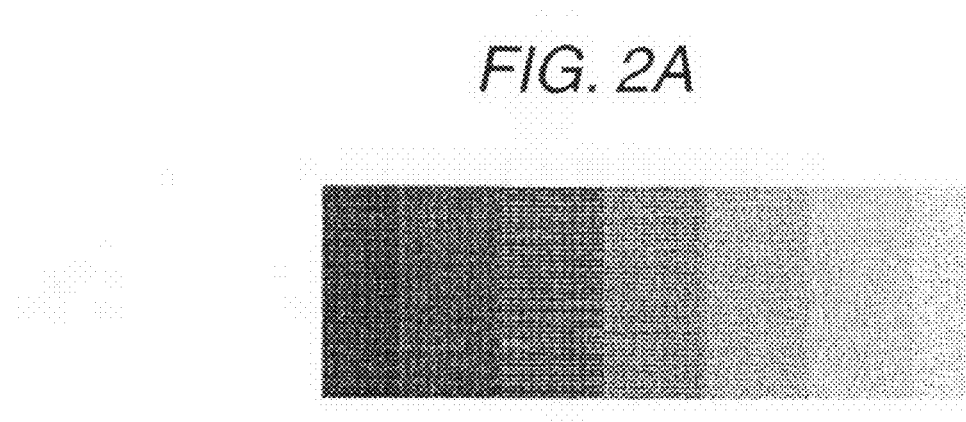
FIGS. 2A and 2B are diagrams of a 4-bit image formed by omitting lower 4 bits of the 8-bit image shown and a pixel value on a certain horizontal line of the image.
Figure 2B:
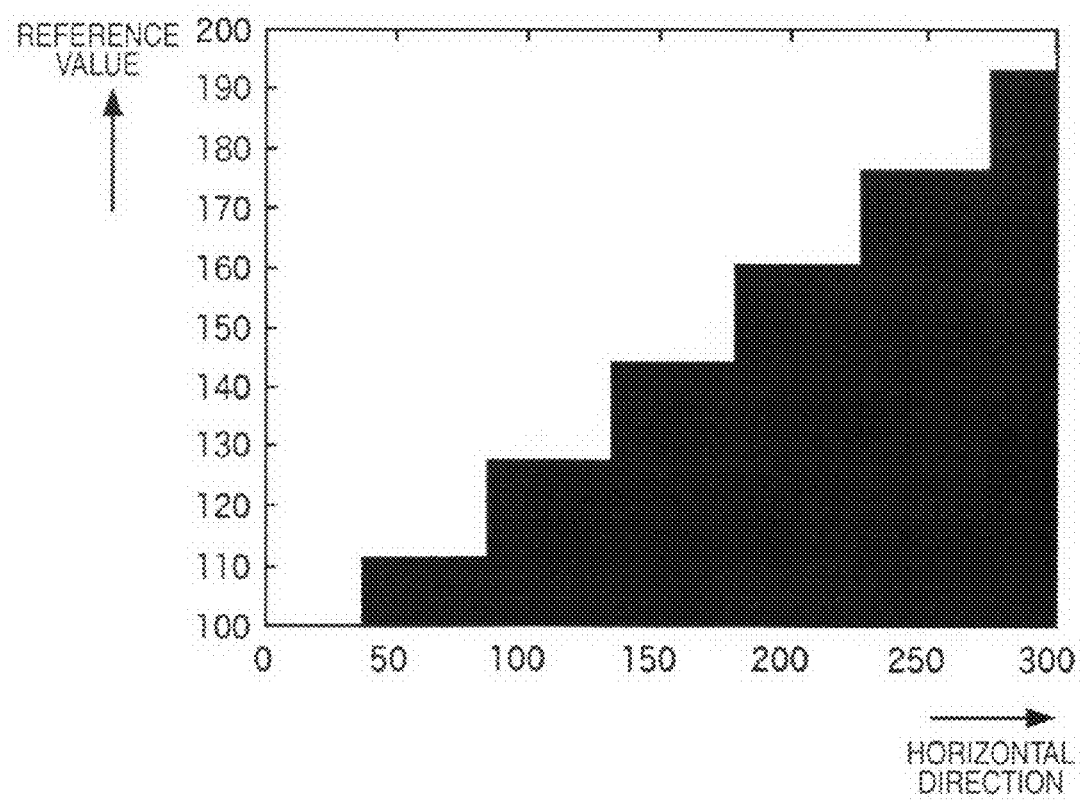
Figure 3A:
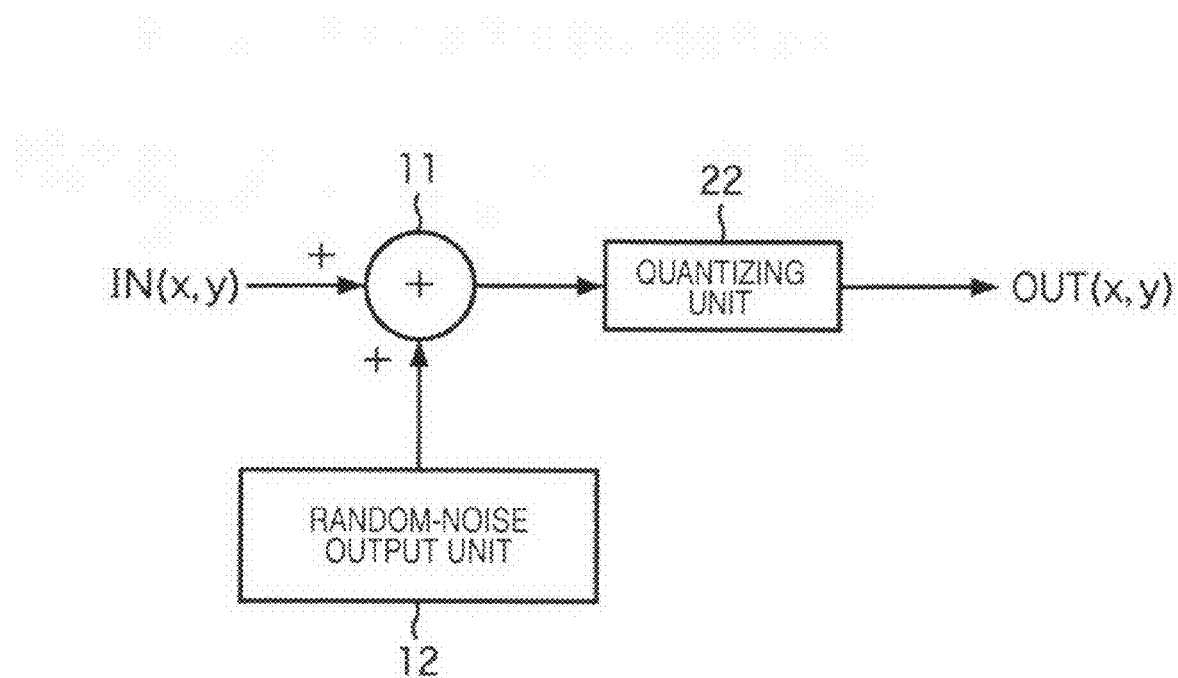
FIGS. 3A and 3B are diagrams for explaining a random dither method.
Figure 3B:
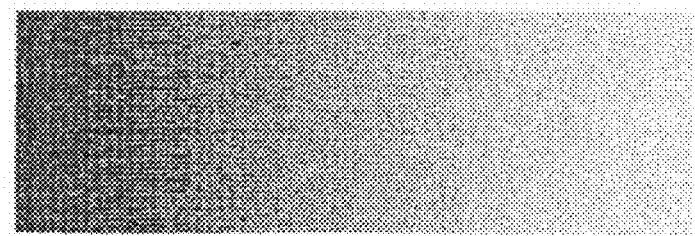
Figure 4A:
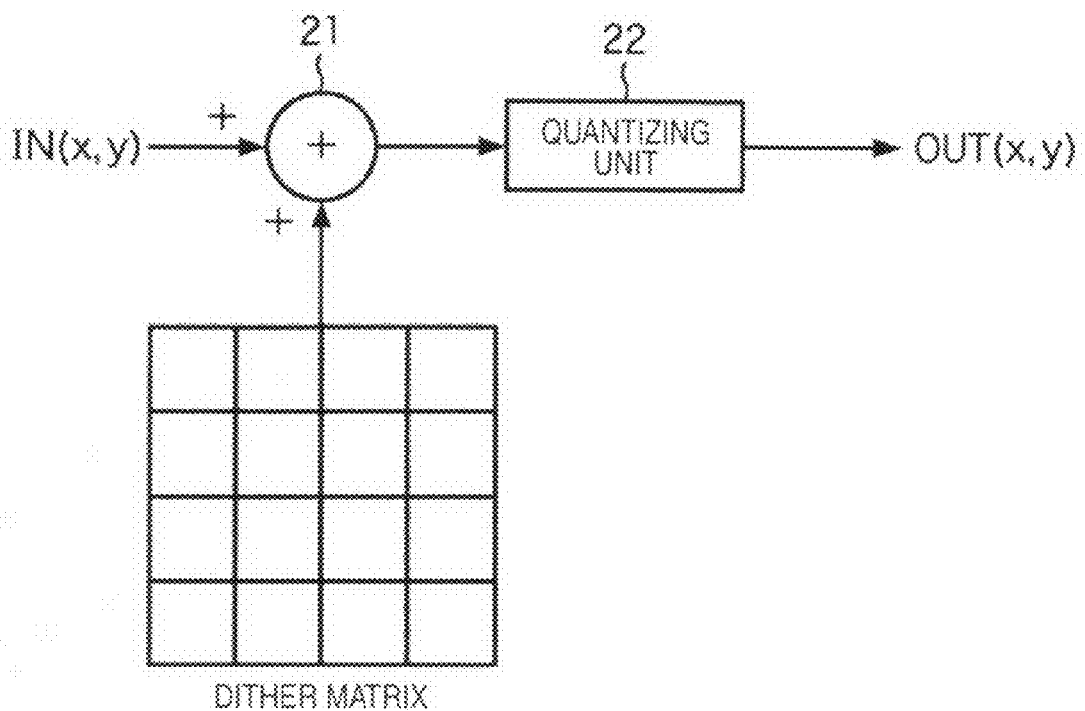
FIGS. 4A and 4B are diagrams for explaining an ordered dither method.
Figure 4B:
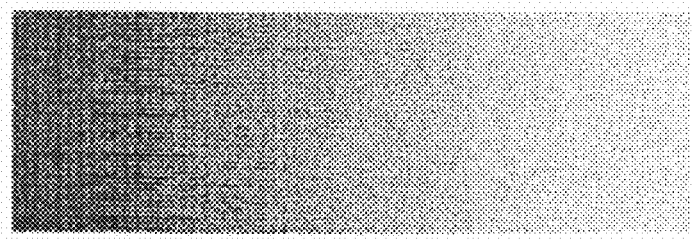

FIG. 10A is a diagram of a 4-bit image (an image after the gradation conversion) obtained as a result of performing the gradation conversion in the gradation converting unit 45 with the 8-bit image shown in FIG. 1A set as a target image. FIG. 10B is a diagram of a pixel value on a certain horizontal line of the 4-bit image after the gradation conversion.

Whereas 256 gradations can be represented by 8 bits, only 16 gradations can be represented by 4 bits. However, in the 4-bit image after the gradation conversion by the gradation converting unit 45, there are sparse and dense regions including sparseness and denseness of pixels, a pixel value of which is a certain quantized value Q, and pixels, a pixel value of which is a quantized value Q+1 larger than the quantized value Q by 1 (or a quantized value Q−1 smaller than the quantized value Q by 1), i.e., a region in which a ratio of the pixels, the pixel value of which is the quantized value Q, is large and a region in which a ratio of the pixels, the pixel value of which is the quantized value Q+1, is large (a region in which a ratio of the pixels, the pixel value of which is the quantized value Q+1, is small and a region in which a ratio of the pixels, the pixel value of which is the quantized value Q, is small). Because of an integral effect of the human vision, it looks as if the pixel values of the sparse and dense regions smoothly change.

As a result, regardless of the fact that only 16 gradations can be represented by 4 bits, 256 gradations can be simulatively represented in the 4-bit image after the gradation conversion by the gradation converting unit 45 as if the 4-bit image is the 8-bit target image before the gradation conversion.

Figure 11:
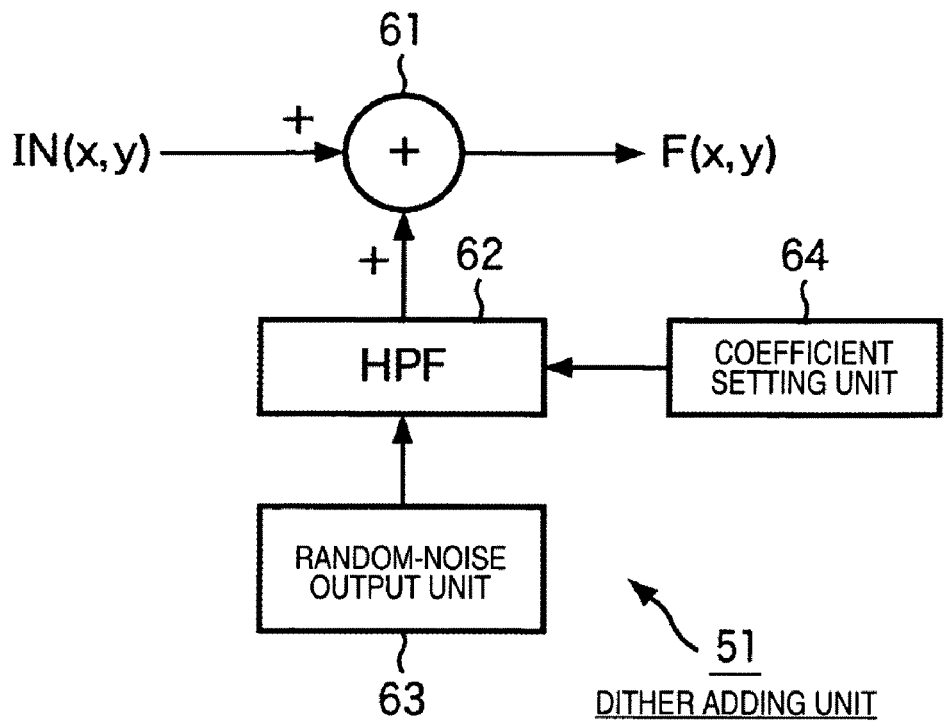
FIG. 11 is a block diagram of a configuration example of a dither adding unit 51.

FIG. 11 is a diagram of a configuration example of the dither adding unit 51 shown in FIG. 7.

In FIG. 11, the dither adding unit 51 includes an arithmetic unit 61, an HPF (High Pass Filter) 62, a random-noise output unit 63, and a coefficient setting unit 64.

The pixel value IN(x,y) of the target image supplied from the noise reduction unit 44 (FIG. 6) is supplied to the arithmetic unit 61 in raster scan order as explained with reference to FIG. 8. An output of the HPF 62 is supplied to the arithmetic unit 61.

The arithmetic unit 61 adds the output of the HPF 62 to the pixel value IN(x,y) of the target image and supplies an added-up value obtained as a result of the addition to the one-dimensional ΔΣ modulation unit 52 (FIG. 7) as a pixel value F(x,y) applied with dither.

The HPF 62 filters, on the basis of a filter coefficient set by the coefficient setting unit 64, random noise outputted by the random-noise output unit 63 and supplies high-frequency components of the random noise obtained as a result of the filtering to the arithmetic unit 61.

The random-noise output unit 63 generates random noise conforming to, for example, the Gaussian distribution and outputs the random noise to the HPF 62.

The coefficient setting unit 64 determines a filter coefficient of the HPF 62 on the basis of the spatial frequency characteristics of the human vision and the resolution of the display unit 47 (FIG. 6) and sets the filter coefficient in the HPF 62.

Specifically, the coefficient setting unit 64 stores the spatial frequency characteristics of the human vision. The coefficient setting unit 64 acquires the resolution of the display unit 47 from the display control unit 46 (FIG. 6). The coefficient setting unit 64 determines a filter coefficient of the HPF 62 on the basis of the spatial frequency characteristics of the human vision and the resolution of the display unit 47 as explained below and sets the filter coefficient in the HPF 62.

Besides, the coefficient setting unit 64 adjusts the filter coefficient of the HPF 62 according to, for example, operation by a user. Consequently, the user can adjust a quality of the image after the gradation conversion by the gradation converting unit 45 to a favorite quality.

In the dither adding unit 51 configured as explained above, the coefficient setting unit 64 determines a filter coefficient of the HPF 62 on the basis of the spatial frequency characteristics of the human vision and the resolution of the display unit 47 and sets the filter coefficient in the HPF 62.

The HPF 62 performs multiply-accumulate or the like of the filter coefficient set by the coefficient setting unit 64 and the random noise outputted by the random-noise output unit 63 to thereby filter the random noise outputted by the random-noise output unit 63 and supplies high-frequency components of the random noise to the arithmetic unit 61.

The arithmetic unit 61 adds up the 12-bit pixel value IN(x,y) of the target image supplied from the noise reduction unit 44 (FIG. 6) and the high-frequency components of the random noise supplied from the HPF 62. The arithmetic unit 61 supplies, for example, an added-up value of 12 bits same as the number of bits of the target image (or an added-up value of the number of bits equal to or larger than the number of bits of the target image) to the one-dimensional ΔΣ modulation unit 52 (FIG. 7) as the pixel value F(x,y) applied with the dither.

A method of determining a filter coefficient of the HPF 62 on the basis of the spatial frequency characteristics of the human vision and the resolution of the display unit 47 is explained below with reference to FIG. 12 to FIGS. 14A and 14B. The method is performed by the coefficient setting unit 64.

Figure 12:
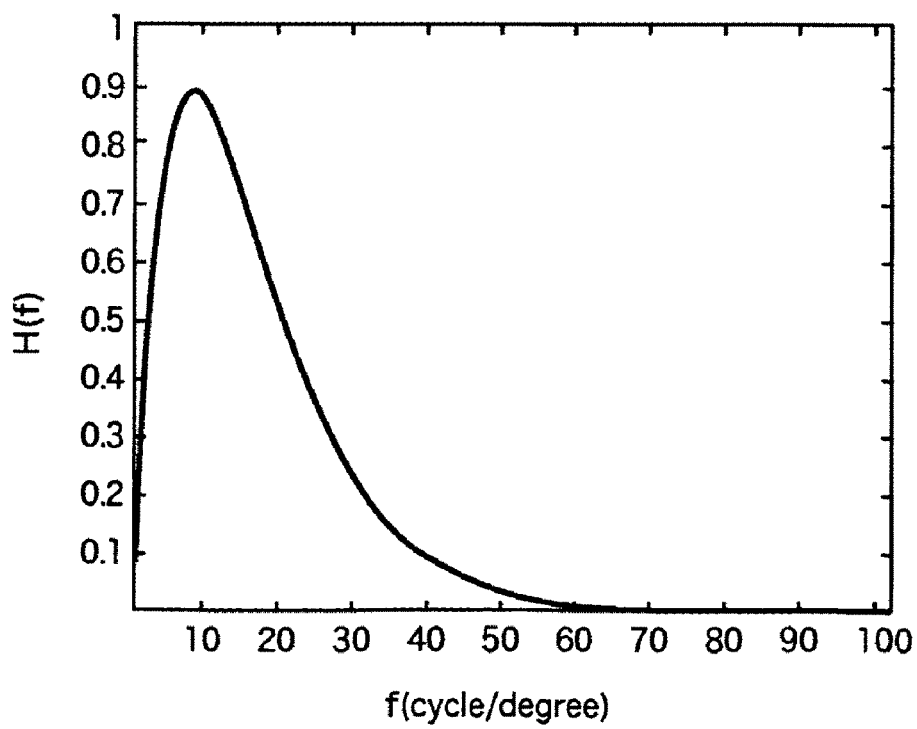
FIG. 12 is a graph of the spatial frequency characteristics of the human vision.

FIG. 12 is a graph of the spatial frequency characteristics of the human vision.

In FIG. 12, the abscissa represents the spatial frequency and the ordinate represents the sensitivity of the human vision.

As shown in FIG. 12, the sensitivity of the human vision is the highest near the spatial frequency of 9 cycle/degree and is lower at higher spatial frequency.

Figure 13:
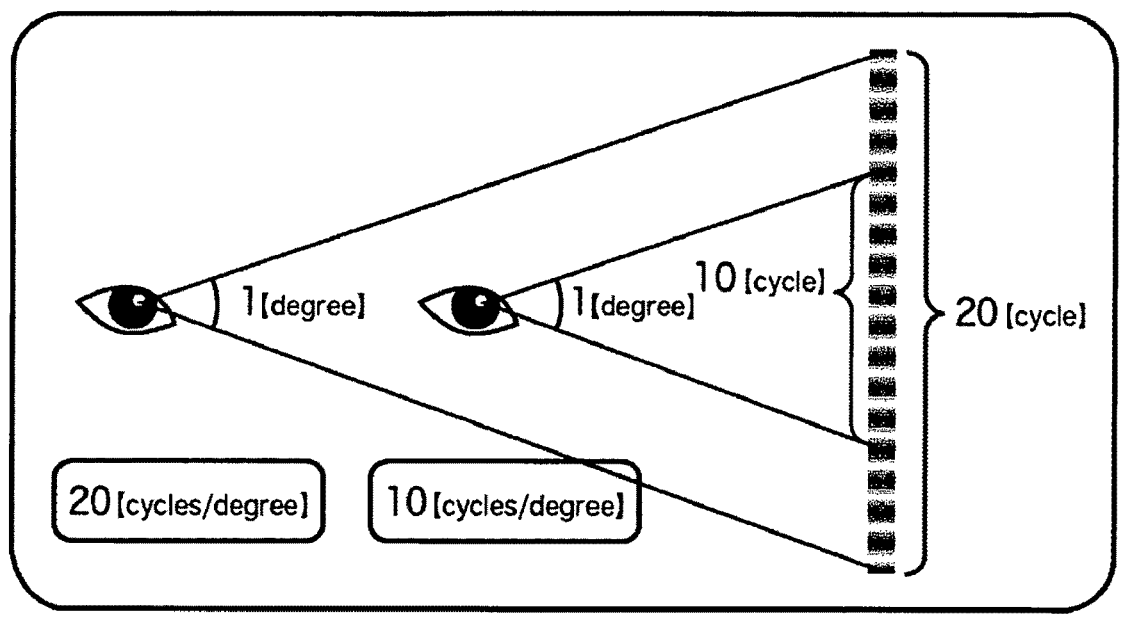
FIG. 13 is a diagram for explaining cycle/degree as a unit of a spatial frequency.

FIG. 13 is a diagram for explaining cycle/degree as a unit of the spatial frequency.

Cycle/degree represents the number of a striped pattern that is seen in a range of a unit angle with respect to an angle of field. For example, 10 cycle/degree means that ten pairs of a white line and a black line are seen in a range of an angle of field of 1 degree. 20 cycle/degree means that twenty pairs of a white line and a black line are seen in the range of the angle of field of 1 degree.

The image after the gradation conversion by the gradation converting unit 45 is finally displayed on the display unit 47 (FIG. 6). Therefore, from the viewpoint of improving a quality of an image displayed on the display unit 47, spatial frequencies up to a maximum spatial frequency of the image displayed on the display unit 47 only have to be taken into account concerning the spatial frequency characteristics of the human vision.

Therefore, the coefficient setting unit 64 (FIG. 11) determines a filter coefficient of the HPF 62 on the basis of characteristics of spatial frequencies equal to or lower than a spatial frequency corresponding to the resolution of the display unit 47 among the spatial frequency characteristics of the human vision.

In other words, the maximum spatial frequency of the image displayed on the display unit 47 can be obtained as a spatial frequency in cycle/degree units from the resolution of the display unit 47 and a distance from a viewer to the display unit 47 (hereinafter also referred to as viewing distance) at the time when the viewer views the image displayed on the display unit 47.

When the length in the vertical direction (longitudinal length) of the display unit 47 is represented as H inches, for example, about 2.5 H to 3.0 H is adopted as the viewing distance.

For example, when the display unit 47 has a 40-inch size with 1920×1080 pixels for displaying a so-called full HD (High Definition) image, the maximum spatial frequency of the image displayed on the display unit 47 is 30 cycle/degree.

The maximum spatial frequency of the image displayed on the display unit 47 depends on the resolution of the display unit 47. Therefore, in the following explanation, the maximum spatial frequency is referred to, as appropriate, as spatial frequency corresponding to the resolution as well.

Figure 14A:
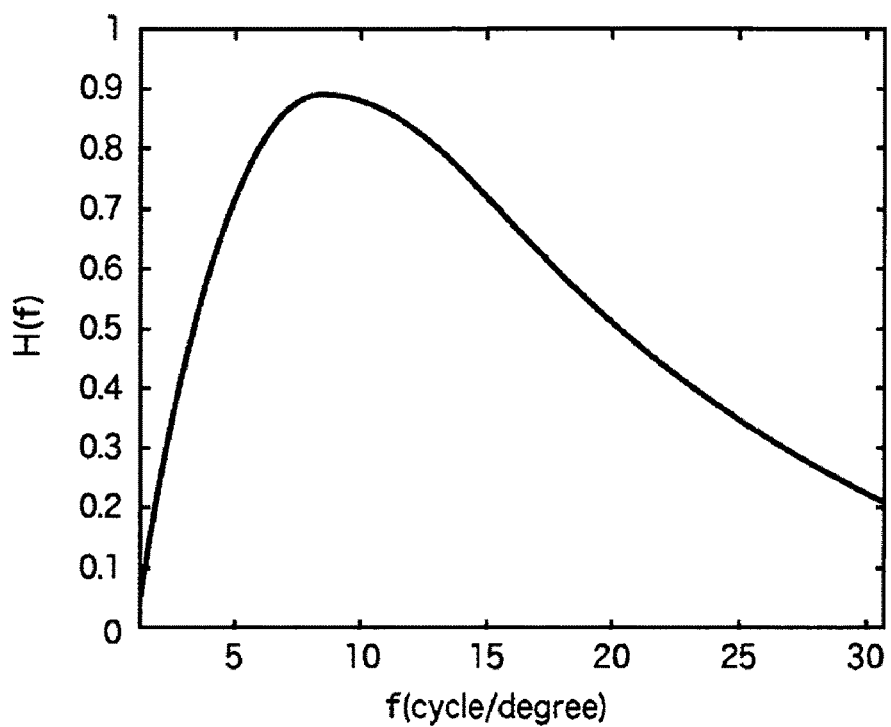
FIGS. 14A and 14B are graphs for explaining a method with which a coefficient setting unit 64 determines a filter coefficient of an HPF 62.
Figure 14B:
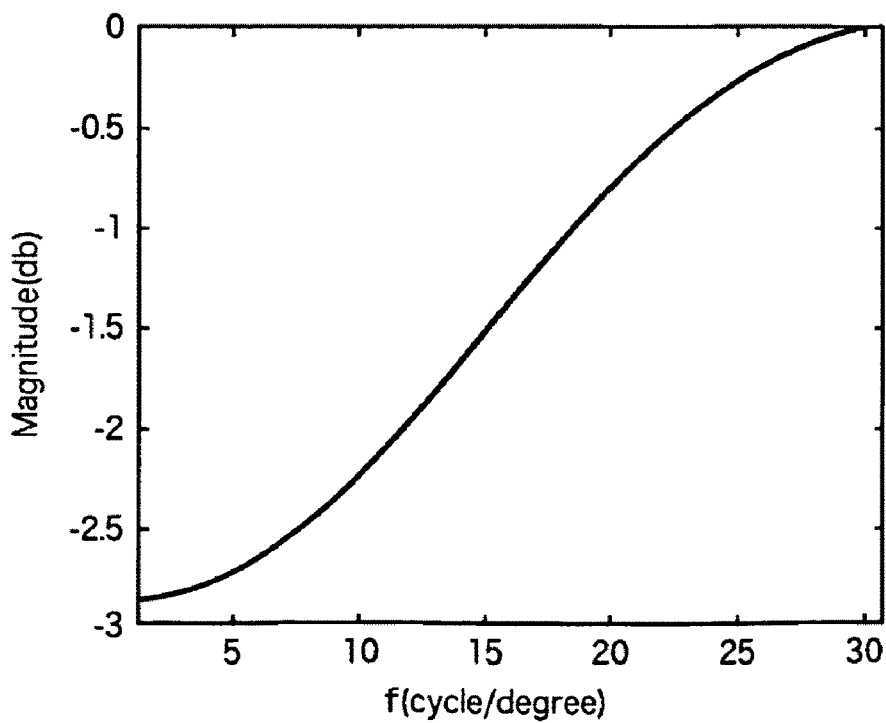

FIGS. 14A and 14B are graphs for explaining a method with which the coefficient setting unit 64 (FIG. 11) determines a filter coefficient of the HPF 62 on the basis of characteristics of spatial frequencies equal to or lower than the spatial frequency corresponding to the resolution of the display unit 47 among the spatial frequency characteristics of the human vision.

FIG. 14A is a graph of characteristics of frequencies equal to or lower than the spatial frequency corresponding to the resolution of the display unit 47 among the spatial frequency characteristics of the human vision.

In FIG. 14A, characteristics of spatial frequencies equal to or lower than 30 cycle/degree among the spatial frequency characteristics of the human vision shown in FIG. 12 are shown on the assumption that the spatial frequency corresponding to the resolution of the display unit 47 is, for example, 30 cycle/degree.

The coefficient setting unit 64 determines a filter coefficient of the HPF 62 on the basis of the spatial frequency characteristics of the human vision shown in FIG. 14A such that high-frequency characteristics of amplitude characteristics of the HPF 62 are opposite characteristics of the spatial frequency characteristics of the human vision shown in FIG. 14A.

FIG. 14B is a graph of the amplitude characteristics of the HPF 62, the filter coefficient of which is determined as explained above.

The amplitude characteristics shown in FIG. 14B are characteristics of an HPF that a gain is the largest (e.g., 0 dB) at 30 cycle/degree, which is the spatial frequency corresponding to the resolution of the display unit 47, and high-frequency characteristics are opposite characteristics of the spatial frequency characteristics of the human vision shown in FIG. 14A.

Therefore, in the HPF 62 (FIG. 11) having the amplitude characteristics shown in FIG. 14B, a larger number of higher-frequency components, for which the sensitivity of the human vision is low, in the random noise outputted from the random-noise output unit 63 pass. Frequency components near 9 cycle/degree, for which the sensitivity of the human vision is high, and corresponding to a spatial frequency lower than 9 cycle/degree are cut.

As a result, in the arithmetic unit 61 (FIG. 11), the frequency components, for which the sensitivity of the human vision is high, in the random noise are not added (hardly added) to the pixel value IN(x,y) of the target image. A large number of the high-frequency components, for which the sensitivity of the human vision is low, are added to the pixel value IN(x,y) of the target image. Therefore, it is possible to prevent noise from being visually recognized in the image after the gradation conversion by the gradation converting unit 45 and improve an image quality in appearance.

The high-frequency characteristics of the amplitude characteristics of the HPF 62 do not need to completely coincide with the opposite characteristics of the spatial frequency characteristics of the human vision. In other words, the high-frequency characteristics of the amplitude characteristics of the HPF 62 only have to be similar to the opposite characteristics of the spatial frequency characteristics of the human vision.

As a filter for filtering random noise outputted by the random-noise output unit 63 (hereinafter also referred to as noise filter), a filter, entire amplitude characteristics of which are opposite characteristics of the spatial frequency characteristics of the human vision shown in FIG. 14A, can be adopted instead of the HPF 62.

According to the spatial frequency characteristics of the human vision shown in FIG. 14A, as the frequency components for which the sensitivity of the human vision is low, there are low-frequency components besides the high-frequency components. As the noise filter, a band pass filter that passes high and low frequency components in the random noise outputted by the random-noise output unit 63 can be adopted.

However, when the band pass filter is adopted as the noise filter, the number of taps of the noise filter increases and the device is increased in size and cost.

According to the simulation performed by the inventor, even if the band pass filter was adopted as the noise filter, significant improvement was not realized in an image quality of the image after the gradation conversion compared with an image quality obtained when the HPF 62 was adopted.

When the band pass filter was adopted as the noise filter, besides the high-frequency components, the low-frequency components in the random noise were added to the pixel value IN(x,y) of the target image. As a result, in some case, a section in which a large number of pixels, a pixel value of which was the quantized value Q, or a large number of pixels, a pixel value of which was the quantized value Q+1, continued appeared in the sparse and dense regions explained with reference to FIGS. 10A and 10B. As a result, unnatural lines were seen in the image after the gradation conversion.

Therefore, from the viewpoint of the size and the cost of the device and from the viewpoint of the image quality of the image after the gradation conversion, as the noise filter, it is desirable to adopt the HPF 62, the high-frequency characteristics of the amplitude characteristics of which are the opposite characteristics of the spatial frequency characteristics of the human vision, shown in FIG. 14B.

Figure 15:
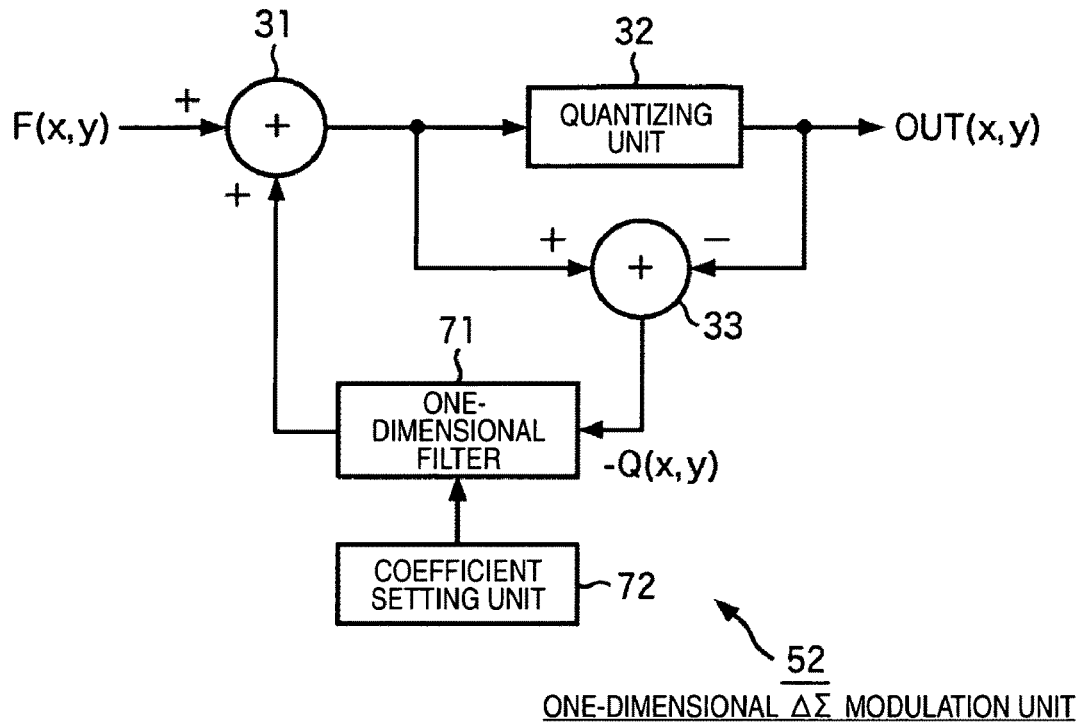
FIG. 15 is a block diagram of a configuration example of a one-dimensional $\Delta\Sigma$ modulation unit 52.

FIG. 15 is a diagram of a configuration example of the one-dimensional ΔΣ modulation unit 52 shown in FIG. 7.

Figure 5A:
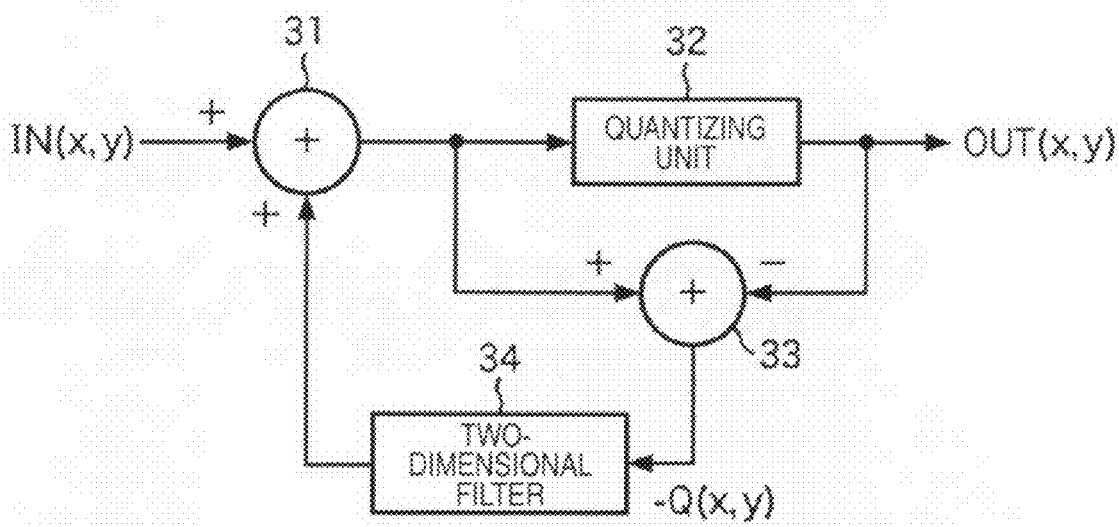
FIGS. 5A and 5B are diagrams for explaining an error diffusion method.
Figure 5B:
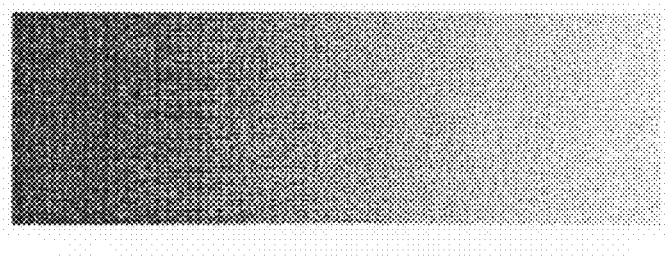

In FIG. 15, components corresponding to those of the gradation converting device as the two-dimensional ΔΣ modulator shown in FIG. 5A are denoted by the same reference numerals and signs.

In FIG. 15, the one-dimensional ΔΣ modulation unit 52 includes the arithmetic unit 31, the quantizing unit 32, the arithmetic unit 33, a one-dimensional filter 71, and a coefficient setting unit 72.

The pixel value F(x,y) of the image applied with the dither is supplied to the arithmetic unit 31 from the dither adding unit 51 (FIG. 7) in raster scan order. An output of the one-dimensional filter 71 is supplied to the arithmetic unit 31.

The arithmetic unit 31 adds up the pixel value F(x,y) supplied from the dither adding unit 51 and the output of the one-dimensional filter 71 and supplies an added-up value obtained as a result of the addition to the quantizing unit 32 and the arithmetic unit 33.

The quantizing unit 32 quantizes the added-up value supplied from the arithmetic unit 31 into 8 bits, which is the number of bits of an image displayed by the display unit 47 (FIG. 6). The quantizing unit 32 supplies an 8-bit quantized value (a quantized value including the quantization error −Q(x,y)) obtained as a result of the quantization to the arithmetic unit 33 and the display control unit 46 (FIG. 6) as the pixel value OUT(x,y) of the pixel (x,y) of the image after the gradation conversion.

The one-dimensional ΔΣ modulation unit 52 acquires the number of bits of the image displayed by the display unit 47 from the display control unit 46 and controls the quantizing unit 32 to perform quantization of the number of bits into a quantized value.

The arithmetic unit 33 subtracts the pixel value OUT(x,y) supplied from the quantizing unit 32 from the added-up value supplied from the arithmetic unit 31, i.e., subtracts the output from the quantizing unit 32 from the input to the quantizing unit 32 to calculate the quantization error −Q(x,y) caused by the quantization in the quantizing unit 32. The arithmetic unit 33 supplies the quantization error −Q(x,y) to the one-dimensional filter 71.

The one-dimensional filter 71 is a one-dimensional filter for filtering a signal. The one-dimensional filter 71 filters the quantization error −Q(x,y) supplied from the arithmetic unit 33 and outputs a result of the filtering to the arithmetic unit 31.

The arithmetic unit 31 adds up the result of the filtering of the quantization error −Q(x,y) outputted by the one-dimensional filter 71 as explained above and the pixel value IN(x,y).

The coefficient setting unit 72 determines a filter coefficient of the one-dimensional filter 71 on the basis of the spatial frequency characteristics of the human vision and the resolution of the display unit 47 (FIG. 6) and sets the filter coefficient in the one-dimensional filter 71.

Specifically, the coefficient setting unit 72 stores the spatial frequency characteristics of the human vision. The coefficient setting unit 72 acquires the resolution of the display unit 47 from the display control unit 46 (FIG. 6). The coefficient setting unit 72 determines a filter coefficient of the one-dimensional filter 71 on the basis of the spatial frequency characteristics of the human vision and the resolution of the display unit 47 as explained below and sets the filter coefficient in the one-dimensional filter 71.

Besides, the coefficient setting unit 72 adjusts the filter coefficient of the one-dimensional filter 71 according to, for example, operation by the user. Consequently, the user can adjust a quality of the image after the gradation conversion by the gradation converting unit 45 to a favorite quality.

In the one-dimensional ΔΣ modulation unit 52 configured as explained above, the coefficient setting unit 72 determines a filter coefficient of the one-dimensional filter 71 on the basis of the spatial frequency characteristics of the human vision and the resolution of the display unit 47 and sets the filter coefficient in the one-dimensional filter 71.

The one-dimensional filter 71 performs multiply-accumulate or the like of the filter coefficient set by the coefficient setting unit 72 and the quantization error −Q(x,y) outputted by the arithmetic unit 33 to thereby filter the quantization error −Q(x,y) outputted by the arithmetic unit 33 and supplies high-frequency components of the quantization error −Q(x,y) to the arithmetic unit 31.

The arithmetic unit 31 adds up the pixel value F(x,y) supplied from the dither adding unit 51 and the output of the one-dimensional filter 71 and supplies an added-up value obtained as a result of the addition to the quantizing unit 32 and the arithmetic unit 33.

The quantizing unit 32 quantizes the added-up value supplied from the arithmetic unit 31 into 8 bits, which is the number of bits of an image displayed by the display unit 47 (FIG. 6). The quantizing unit 32 supplies an 8-bit quantized value obtained as a result of the quantization to the arithmetic unit 33 and the display control unit 46 (FIG. 6) as the pixel value OUT(x,y) of the image after the gradation conversion.

The arithmetic unit 33 subtracts the pixel value OUT(x,y) supplied from the quantizing unit 32 from the added-up value supplied from the arithmetic unit 31 to calculate the quantization error −Q(x,y) included in the pixel value OUT(x,y) supplied from the quantizing unit 32. The arithmetic unit 33 supplies the quantization error −Q(x,y) to the one-dimensional filter 71.

The one-dimensional filter 71 filters the quantization error −Q(x,y) supplied from the arithmetic unit 33 and outputs a result of the filtering to the arithmetic unit 31. The arithmetic unit 31 adds up the result of the filtering of the quantization error −Q(x,y) outputted by the one-dimensional filter 71 as explained above and the pixel value IN(x,y).

In the one-dimensional ΔΣ modulation unit 52, the quantization error −Q(x,y) is fed back to the input side (the arithmetic unit 31) via the one-dimensional filter 71. The one-dimensional ΔΣ modulation unit 52 performs one-dimensional ΔΣ modulation according to the quantization error −Q(x,y). Therefore, the one-dimensional ΔΣ modulation unit 52 applies the one-dimensional ΔΣ modulation to the pixel value F(x,y) supplied from the dither adding unit 51 and outputs the pixel value OUT(x,y) as a result of the one-dimensional ΔΣ modulation.

In the one-dimensional ΔΣ modulation unit 52 shown in FIG. 15, the quantization error −Q(x,y) is a quantization error with respect to the pixel value F(x,y). However, when the pixel value OUT(x,y) is calculated by ΔΣ-modulating the pixel value F(x,y), the quantization error −Q(x,y) with respect to the pixel value (x,y) is not used and a quantization error with respect to a pixel value before (a pixel value processed earlier than) the pixel value F(x,y) is used.

The arithmetic unit 31 adds, to the pixel value F(x,y), a result of filtering by the one-dimensional filter 71 performed by using, for example, quantization errors with respect to pixel values F(x−1,y), F(x−2,y), F(x−3,y), F(x−4,y), and F(x−5,y) of five pixels processed immediately before the pixel value F(x,y).

Figure 16:
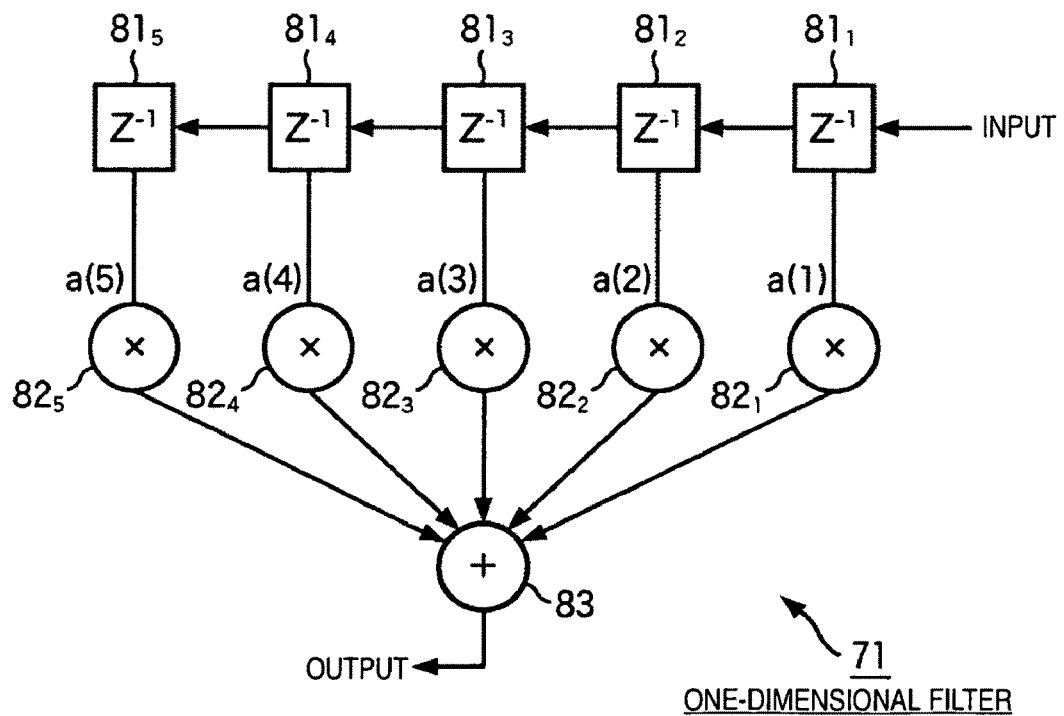
FIG. 16 is a block diagram of a configuration example of a one-dimensional filter 71.

FIG. 16 is a diagram of a configuration example of the one-dimensional filter 71 shown in FIG. 15.

In FIG. 16, the one-dimensional filter 71 includes delaying units $81_1$ to $81_5$, multiplying units $82_1$ to $82_5$, and an adding unit 83 and configures a 5-tap FIR (Finite Impulse Response) filter.

A stored value in a delaying unit $81_{i-1}$ at a pre-stage is inputted to a delaying unit $81_i$ (i=1, 2, 3, 4, and 5). The delaying unit $81_i$ temporarily stores the input thereto to thereby delay the input by time equivalent to one pixel and outputs the stored value to a delaying unit $81_{i+1}$ at a post stage and a multiplying unit $82_i$.

The quantization error −Q(x,y) supplied from the arithmetic unit 33 (FIG. 15) is supplied to the delaying unit $81_1$ at the foremost stage. The delaying unit $81_1$ stores the quantization error −Q(x,y) to thereby delay the same.

The delaying unit $81_5$ at the rearmost stage outputs an input after the delay only to the multiplying unit $82_5$.

The multiplying unit $82_i$ multiplies the output of the delaying unit $81_i$ and a filter coefficient a(i) together and supplies a multiplied value obtained as a result of the multiplication to the adding unit 83.

The adding unit 83 adds up multiplied values supplied from the multiplying units $82_1$ to $82_5$ and outputs an added-up value obtained as a result of the addition to the arithmetic unit 31 (FIG. 15) as a result of filtering of the quantization error −Q(x,y).

As explained above, in the one-dimensional filter 71, the delaying unit $81_i$ that stores quantization errors of several (in FIG. 16, five) pixels on one horizontal line is necessary. However, it is unnecessary to provide the line memories that are necessary for the two-dimensional filter 34 shown in FIG. 5A.

Therefore, with the one-dimensional ΔΣ modulation unit 52 including such a one-dimensional filter 71, it is possible to realize a reduction in size and a reduction in cost of the device compared with the two-dimensional ΔΣ modulator shown in FIG. 5A.

A method of determining a filter coefficient of the one-dimensional filter 71 on the basis of the spatial frequency characteristics of the human vision and the resolution of the display unit 47 is explained below with reference to FIGS. 17A and 17B. The method is performed by the coefficient setting unit 72 shown in FIG. 15.

In the one-dimensional ΔΣ modulation unit 52 shown in FIG. 15, when the added-up value outputted by the arithmetic unit 31 is represented as U(x,y), the following Formulas (1) and (2) hold.

$$-Q(x,y)=U(x,y)-\text{OUT}(x,y) \quad (1)$$

$$U(x,y)=F(x,y)+K\times(-Q(x,y)) \quad (2)$$

When Formula (2) is substituted in Formula (1) to delete U(x,y), Formula (3) is obtained.

$$\text{OUT}(x,y)=F(x,y)+(1-K)\times Q(x,y) \quad (3)$$

In Formula (3), K represents a transfer function of the one-dimensional filter 71.

In the ΔΣ modulation, noise shaping for, so to speak, pushing a quantization error to a high-frequency side is performed. In Formula (3), the quantization error Q(x,y) is modulated by (1−K). This modulation is the noise shaping.

Therefore, amplitude characteristics of the noise shaping performed in the ΔΣ modulation by the one-dimensional ΔΣ modulation unit 52 depend not only on the characteristics of the one-dimensional filter 71 but also on the filter coefficient of the one-dimensional filter 71.

As explained with reference to FIG. 12, the sensitivity of the human vision is the highest at the spatial frequency of 9 cycle/degree and is lower at higher frequencies.

On the other hand, the image after the gradation conversion by the gradation converting unit 45 is finally displayed on the display unit 47 (FIG. 6). Therefore, from the viewpoint of improving a quality of an image displayed on the display unit 47, spatial frequencies up to the spatial frequency corresponding to the resolution of the display unit 47, i.e., a maximum spatial frequency of the image displayed on the display unit 47 only have to be taken into account concerning the spatial frequency characteristics of the human vision.

Therefore, the coefficient setting unit 72 (FIG. 15) determines a filter coefficient of the one-dimensional filter 71 on the basis of characteristics of spatial frequencies equal to or lower than the spatial frequency corresponding to the resolution of the display unit 47 among the spatial frequency characteristics of the human vision.

Figure 17A:
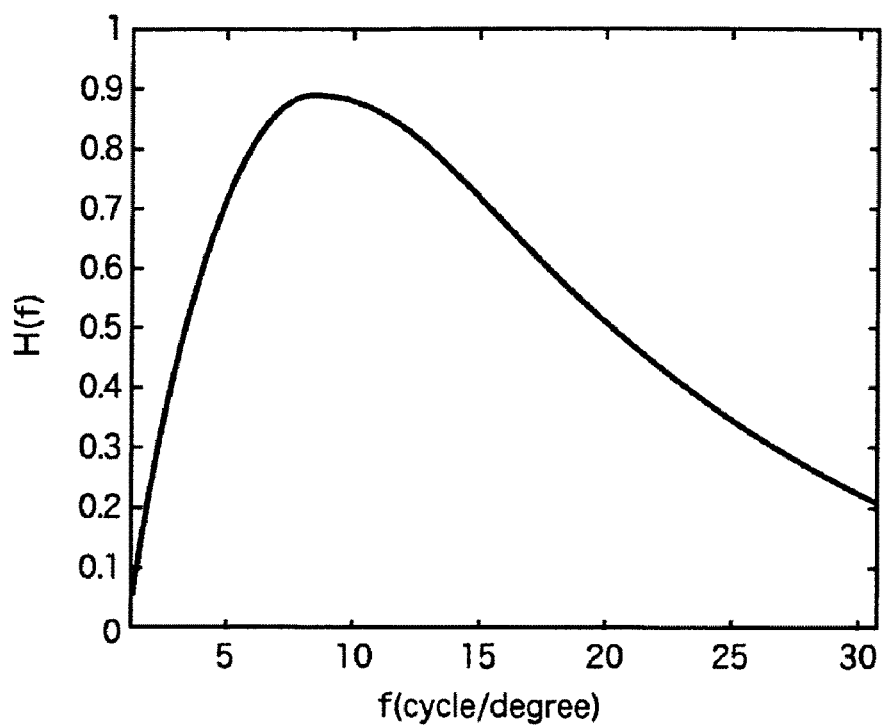
FIGS. 17A and 17B are graphs for explaining a method of determining a filter coefficient of the one-dimensional filter 71 performed by a coefficient setting unit 72.
Figure 17B:
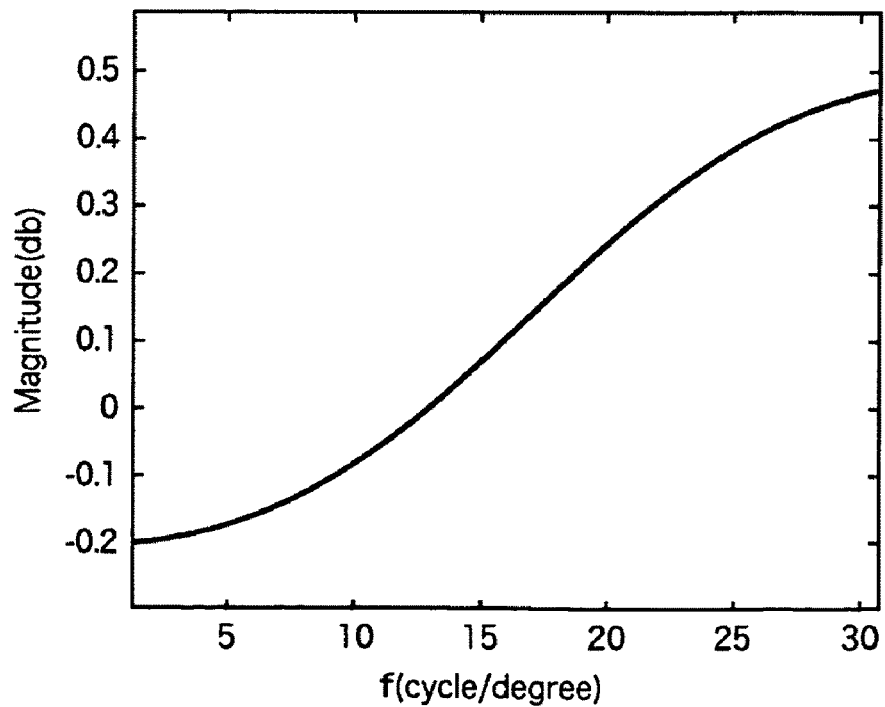

FIGS. 17A and 17B are graphs for explaining a method of determining a filter coefficient of the one-dimensional filter 71 on the basis of the characteristics of spatial frequencies equal to or lower than the spatial frequency corresponding to the resolution of the display unit 47 among the spatial frequency characteristics of the human vision. The method is performed by the coefficient setting unit 72 (FIG. 15).

FIG. 17A is a graph of the characteristics of spatial frequencies equal to or lower than the spatial frequency corresponding to the resolution of the display unit 47 among the spatial frequency characteristics of the human vision.

In FIG. 17A, assuming that the spatial frequency corresponding to the resolution of the display unit 47 is, for example, 30 cycle/degree, characteristics of spatial frequencies equal to or lower than 30 cycle/degree among the spatial frequency characteristics of the human vision shown in FIG. 12 are shown. Therefore, FIG. 17A is the same as FIG. 14A explained above.

The coefficient setting unit 72 determines a filter coefficient of the one-dimensional filter 71 on the basis of the spatial frequency characteristics of the human vision shown in FIG. 17A such that high-frequency characteristics of amplitude characteristics of the noise shaping depending on the characteristics of the one-dimensional filter 71 are opposite characteristics of the spatial frequency characteristics of the human vision shown in FIG. 17A.

FIG. 17B is a graph of amplitude characteristics of the noise shaping depending on the characteristics of the one-dimensional filter 71, the filter coefficient of which is determined as explained above.

The amplitude characteristics shown in FIG. 17B are characteristics of an HPF that a gain is the largest (e.g., 0 dB) at 30 cycle/degree, which is the spatial frequency corresponding to the resolution of the display unit 47, and high-frequency characteristics are opposite characteristics of the spatial frequency characteristics of the human vision shown in FIG. 17A.

Therefore, with the noise shaping having the amplitude characteristics shown in FIG. 17B, in the quantization errors included in the pixel value OUT(x,y) of the image after the gradation conversion, higher-frequency components, for which the sensitivity of the human vision is low, are large and frequency components corresponding to spatial frequencies near 9 cycle/degree, for which the sensitivity of the human vision is high, and spatial frequencies lower than 9 cycle/degree are small.

As a result, it is possible to prevent noise from being visually recognized in the image after the gradation conversion by the gradation converting unit 45 and improve an image quality in appearance.

Like the amplitude characteristics of the HPF 62 (FIG. 11) explained with reference to FIGS. 14A and 14B, the high-frequency characteristics of the amplitude characteristics of the noise shaping do not need to completely coincide with the opposite characteristics of the spatial frequency characteristics of the human vision. In other words, the high-frequency characteristics of the amplitude characteristics of the noise shaping only have to be similar to the opposite characteristics of the spatial frequency characteristics of the human vision.

Like the HPF 62 explained with reference to FIGS. 14A and 14B, the entire high-frequency characteristics of the amplitude characteristics of the noise shaping can be set to the opposite characteristics of the spatial frequency characteristics of the human vision shown in FIG. 17A. However, like the HPF 62 (explained with reference to FIGS. 14A and 14B), from the viewpoint of the size and the cost of the device and from the viewpoint of the image quality of the image after the gradation conversion, as the amplitude characteristics of the noise shaping, it is desirable to adopt the characteristics of the HPF, the high-frequency characteristics of the amplitude characteristics of which are the opposite characteristics of the spatial frequency characteristics of the human vision, shown in FIG. 17B.

The one-dimensional filter 71 that determines the amplitude characteristics of the noise shaping includes the five delaying units $81_1$ to $81_5$ as shown in FIG. 16. Therefore, the one-dimensional filter 71 calculates a value added to the pixel value F(x,y) of the pixel (x,y) supplied to the arithmetic unit 31 using quantization errors with respect to pixel values of five pixels processed immediately before the pixel (x,y) (hereinafter also referred to as immediately preceding processed pixels).

When the immediately preceding processed pixels are pixels on a horizontal line same as a horizontal line of the pixel (x,y), in general, there is correlation between the pixel (x,y) and the immediately preceding processed pixels. However, when the immediately preceding processed pixels are pixels on a horizontal line different from the horizontal line of the pixel (x,y) is present, i.e., when the pixel (x,y) is, for example, a pixel at the top of the horizontal line, it is highly likely that there is no correlation between the pixel (x,y) and all the immediately preceding processed pixels.

It is seemingly undesirable that the one-dimensional filter 71 calculates the value added to the pixel value F(x,y) of the pixel (x,y) using the quantization errors with respect to the pixel values of the immediately preceding processed pixels having no correlation with the pixel (x,y). Therefore, it is conceivable to initialize the stored values in the five delaying units $81_1$ to $81_5$ of the one-dimensional filter 71 to a fixed value such as 0 in a horizontal blanking period (and a vertical blanking period) of the image (applied with the dither) supplied from the dither adding unit 51 (FIG. 7) to the arithmetic unit 31.

However, according to the simulation performed by the inventor, it was confirmed that a higher-quality image (image after the gradation conversion) could be obtained when the stored value in the delaying units $81_1$ to $81_5$ of the one-dimensional filter 71 were left stored therein without being initialized than when the stored values were initialized to the fixed value.

Therefore, it is desirable that the one-dimensional filter 71 leaves a stored value in the storing unit $81_i$ stored therein without initializing the stored value in the horizontal blanking period of the image applied with the dither.

A higher-quality image can be obtained when the stored value in the delaying unit $81_i$ is left stored without being initialized to the fixed value in the horizontal blanking period as explained above. This is considered to be because spreading properties of the quantization errors are better than when the stored value is initialized to the fixed value.

Therefore, from the viewpoint of improving the spreading properties of the quantization errors, besides that the one-dimensional filter 71 does not initialize the stored value in the delaying unit $81_i$ in the horizontal blanking period, the stored value in the delaying unit $81_i$ may be initialized by a random number.

Figure 18:
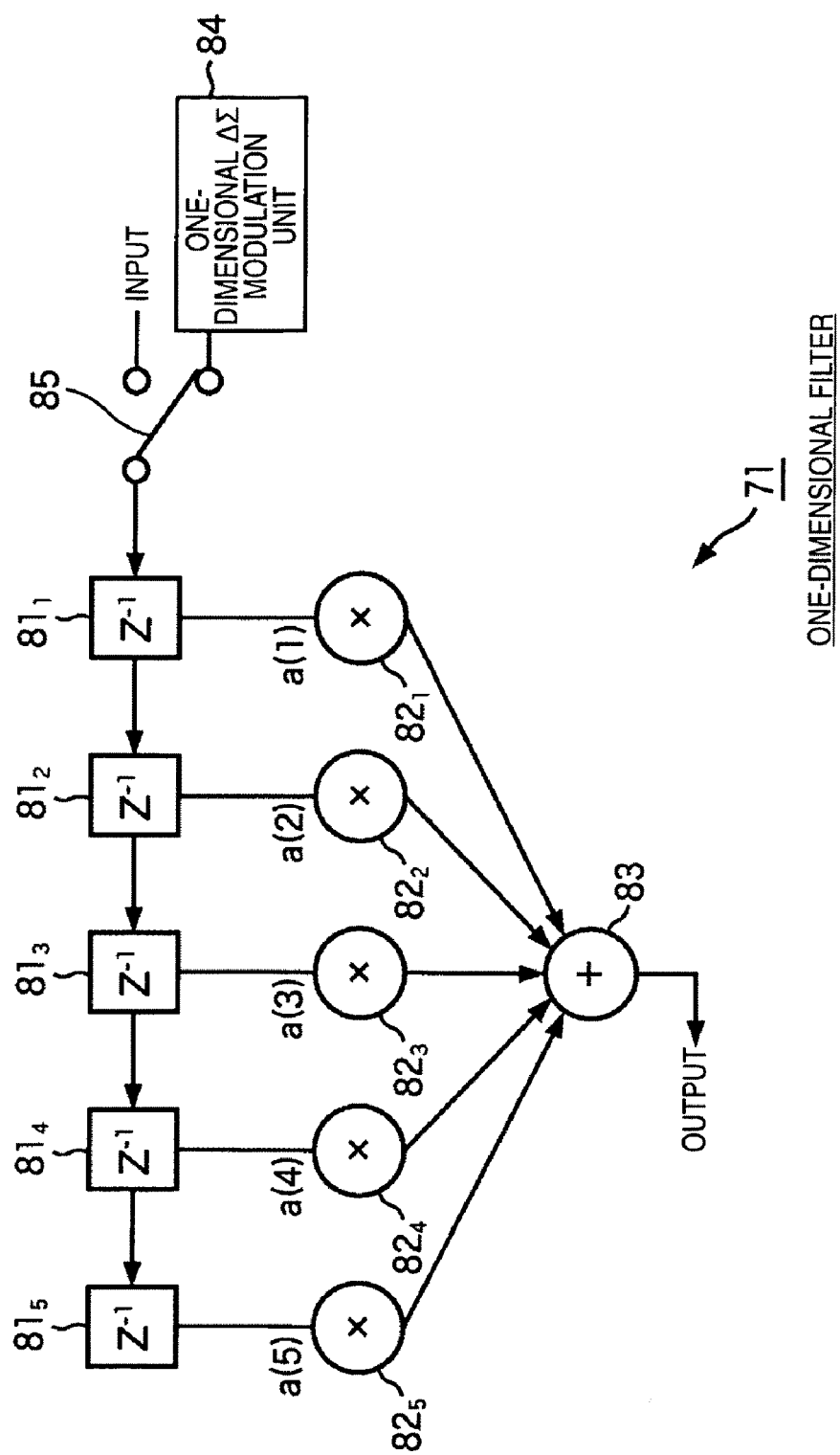
FIG. 18 is a block diagram of another configuration example of the one-dimensional filter 71.

FIG. 18 is a diagram of another configuration example of the one-dimensional filter 71 shown in FIG. 15.

In FIG. 18, components corresponding to those shown in FIG. 16 are denoted by the same reference numerals and signs. Explanation of the components is omitted as appropriate below.

In FIG. 18, the one-dimensional filter 71 is configured the same as that shown in FIG. 16 except that a random-number output unit 84 and a switch 85 are provided anew.

The random-number output unit 84 generates a random number of a value that can be taken as the quantization error −Q(x,y) calculated by the arithmetic unit 33 (FIG. 15) and outputs the random number.

The switch 85 selects the output of the random-number output unit 84 in the horizontal blanking period (and the vertical blanking period). In other periods, the switch 85 selects the quantization error −Q(x,y) supplied from the arithmetic unit 33 (FIG. 15) and supplies the quantization error −Q(x,y) to the delaying unit $81_1$.

In the one-dimensional filter 71 shown in FIG. 18, in the periods other than the horizontal blanking period, the switch 85 selects the quantization error −Q(x,y) supplied from the arithmetic unit 33 and supplies the quantization error −Q(x,y) to the delaying unit $81_1$. Consequently, filtering same as that shown in FIG. 16 is performed.

On the other hand, in the horizontal blanking period, the switch 85 selects the output of the random-number output unit 84. The random-number output unit 84 sequentially supplies five random numbers to the delaying unit $81_1$. Consequently, an ith random number is stored in the delaying unit $81_i$. Concerning a pixel at the top of a horizontal line after the end of the horizontal blanking period, in the horizontal blanking period, an output of the one-dimensional filter 71 as a value to be added by the arithmetic unit 31 (FIG. 15) is calculated by using the random numbers stored in the delaying units $81_1$ to $81_5$.

In the horizontal blanking period, the output from the one-dimensional filter 71 to the arithmetic unit 31 is not performed.

As explained above, in the gradation converting unit 45 (FIG. 7), the dither adding unit 51 adds the random noise to the pixel value forming the image to thereby apply the dither to the image. The one-dimensional ΔΣ modulation unit 52 applies the one-dimensional ΔΣ modulation to the image applied with the dither. Therefore, it is possible to perform the gradation conversion without using the line memories and obtain a high-quality image as an image after the gradation conversion.

Therefore, since it is possible to perform the gradation conversion, with which a high-quality image can be obtained, without using the line memories, it is possible to realize a reduction in size and a reduction in cost of the device.

Since the gradation conversion is performed without using the line memories, the gradation converting unit 45 performs the one-dimensional ΔΣ modulation rather than two-dimensional ΔΣ modulation.

The one-dimensional ΔΣ modulation unit 52 applies the one-dimensional ΔΣ modulation to pixel values supplied in raster scan order. Therefore, in an image after the one-dimensional ΔΣ modulation, the effects of the ΔΣ modulation (the effects of over sampling and noise shaping) are obtained in the horizontal direction but are not obtained in the vertical direction.

Therefore, when only the one-dimensional ΔΣ modulation is performed, in the vertical direction of the image after the one-dimensional ΔΣ modulation, gradation looks poor and quantization noise is conspicuous.

Therefore, the gradation converting unit 45 applies the dither to the image before the one-dimensional ΔΣ modulation. As a result, in the image after the gradation conversion by the gradation converting unit 45, the effect of the dither are obtained in the vertical direction and the effect of the dither and the one-dimensional ΔΣ modulation are obtained in the horizontal direction. It is possible to improve an image quality in appearance in both the horizontal direction and the vertical direction.

The gradation converting unit 45 uses high-frequency components of random noise, which are obtained by filtering the random noise with the HPF 62, for the dither. The gradation converting unit 45 determines a filter coefficient of the HPF 62 on the basis of characteristics of spatial frequencies equal to or lower than the spatial frequency corresponding to the resolution of the display unit 47 (FIG. 6) among the spatial frequency characteristics of the human vision such that high-frequency characteristics of amplitude characteristics of the HPF 62 are opposite characteristics of the spatial frequency characteristics of the human vision.

Therefore, since the high-frequency components of the random noise used for the dither are frequency components, for which the sensitivity of the human vision is low, it is possible to improve an image quality in appearance of the image after the gradation conversion.

The gradation converting unit 45 determines a filter coefficient of the one-dimensional filter 71 (FIG. 15) on the basis of characteristics of spatial frequencies equal to or lower than the spatial frequency corresponding to the resolution of the display unit 47 among the spatial frequency characteristics of the human vision such that high-frequency characteristics of amplitude characteristics of the noise shaping for quantization errors are opposite characteristics of the spatial frequency characteristics of the human vision.

Therefore, since frequency components of the quantization errors are frequency components, for which the sensitivity of the human vision is low, it is possible to improve an image quality in appearance of the image after the gradation conversion.

The dither adding unit 51 (FIG. 11) can be configured without providing the HPF 62 (and the coefficient setting unit 64). In this case, it is possible to reduce the size of the device. However, in this case, an image quality in appearance of the image after the gradation conversion is low compared an image quality realized when the HPF 62 is provided.

When an image to be subjected to the gradation conversion in the gradation converting unit 45 (a target image) has plural components such as YCbCr as pixel values, the gradation conversion processing is performed independently for each of the components. When the target image has a Y component, a Cb component, and a Cr opponent as pixel values, the gradation conversion processing is applied to only the Y component, applied to only the Cb component, and applied to only the Cr component.

The present invention applied to the gradation conversion in the TV has been explained. However, besides the TV, the present invention is applicable to gradation processing in all kinds of apparatuses that process images.

For example, in an HDMI® (High-Definition Multimedia Interface) that is rapidly spreading recently, a deep color for transmitting 10-bit and 12-bit pixel values and the like besides an 8-bit pixel value is specified. However, the gradation conversion processing by the gradation converting unit 45 can be applied to gradation conversion for displaying images of 10-bit and 12-bit pixel values transmitted by such an HDMI on a display that displays the 8-bit image and the like.

For example, when a video apparatus for playing a disk such as a Blu-Ray® disk reproduces, for example, a 12-bit image, the 12-bit image is transmitted from the video apparatus through a transmission line for transmitting an 8-bit image and displayed on a display that displays the 8-bit image. In this case, in the video apparatus, the gradation converting unit 45 performs the gradation conversion processing to thereby convert the 12-bit image into the 8-bit image and transmits the 8-bit image to the display. Consequently, the display can simulatively display the 12-bit image.

The series of processing explained above can be performed by hardware or can be performed by software. When the series of processing is performed by the software, a computer program for the software is installed in a general-purpose computer or the like.

Figure 19:
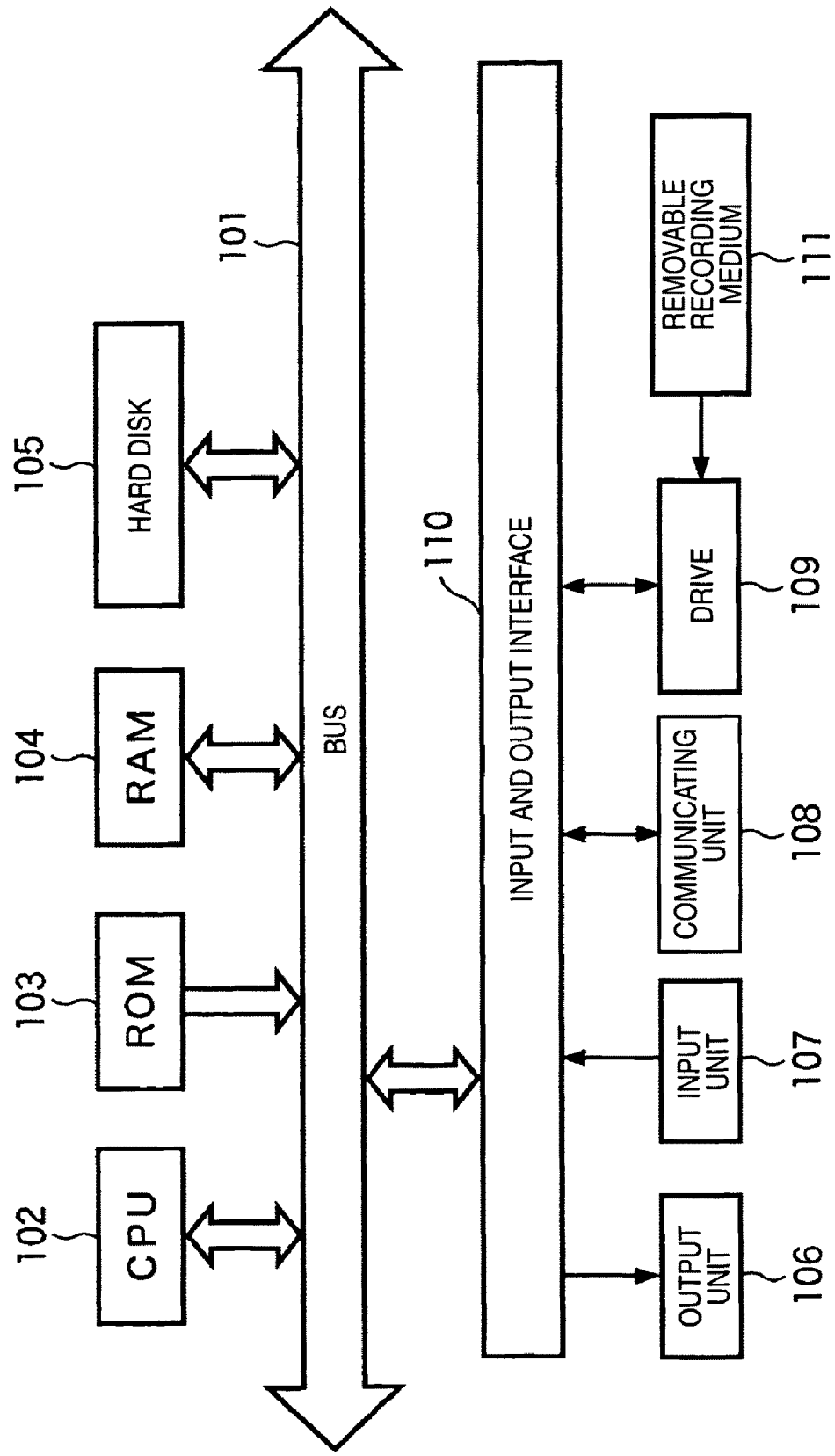
FIG. 19 is a block diagram of a configuration example of a computer according to an embodiment of the present invention.

FIG. 19 is a diagram of a configuration example of a computer according to an embodiment of the present invention in which the computer program for executing the series of processing is installed.

The computer program can be recorded in advance in a hard disk 105 or a ROM (Read Only Memory) 103 serving as a recording medium incorporated in the computer.

Alternatively, the computer program can be temporarily or permanently stored (recorded) in a removable recording medium 111 such as a flexible disk, a CD-ROM (Compact Disc Read Only Memory), an MO (Magneto Optical) disk, a DVD (Digital Versatile Disc), a magnetic disk, or a semiconductor memory. Such a removable recording medium 111 can be provided as so-called package software.

The computer program can be installed in the computer from the removable recording medium 111 explained above. Besides, the computer program can be transferred from a download site to the computer by radio via an artificial satellite for digital satellite broadcasts or transferred from the download site to the computer by wire via a network such as a LAN (Local Area Network) or the Internet. The computer can receive the computer program transferred in that way in a communicating unit 108 and install the computer program in the hard disk 105 incorporated therein.

The computer incorporates a CPU (Central Processing Unit) 102. An input and output interface 110 is connected to the CPU 102 via a bus 101. When the user inputs a command via the input and output interface 110 by, for example, operating an input unit 107 including a keyboard, a mouse, and a microphone, the CPU 102 executes, according to the command, the computer program stored in the ROM (Read Only Memory) 103. Alternatively, the CPU 102 loads the computer program stored in the hard disk 105, the computer program transferred via the satellite or the network, received by the communicating unit 108, and installed in the hard disk 105, or the computer program read out from the removable recording medium 111, which is inserted in a drive 109, and installed in the hard disk 105 onto a RAM (Random Access Memory) 104 and executes the computer program. Consequently, the CPU 102 executes the processing conforming to the flowchart or the processing performed by the device having the configurations shown in the block diagrams. According to necessity, for example, the CPU 102 outputs a result of the processing from an output unit 106 including an LCD (Liquid Crystal Display) and a speaker via the input and output interface 110, transmits the result from the communicating unit 108, or records the result in the hard disk 105.

In this specification, processing steps describing the computer program for causing the computer to execute the various kinds of processing do not always have to be performed in time series according to order described as flowcharts. The processing steps include processing executed in parallel or individually (e.g., parallel processing or processing according to an object).

The computer program may be processed by one computer or may be processed in a distributed manner by plural computers. Further, the computer program may be transferred to a remote computer and executed.

Embodiments of the present invention are not limited to the embodiments explained above. Various modifications of the embodiments are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A gradation converting device that converts gradation of an image, the gradation converting device comprising:
   dither means for applying dither to the image by adding random noise to a pixel value forming the image; and
   one-dimensional ΔΣ modulation means for applying one-dimensional ΔΣ modulation to the image applied with the dither,
   wherein the dither means has an HPF (High Pass Filter) for filtering a signal, filters the random noise with the HPF, and adds high-frequency components of the random noise obtained as a result of the filtering to the pixel value.

2. A gradation converting device according to claim 1, wherein a filter coefficient of the HPF is determined such that high-frequency characteristics of amplitude characteristics of the HPF are opposite characteristics of spatial frequency characteristics of a human vision.

3. A gradation converting device according to claim 2, wherein the filter coefficient of the HPF is determined on the basis of characteristics of spatial frequencies equal to or lower than a spatial frequency corresponding to resolution of displaying means for displaying the image applied with the ΔΣ modulation among the spatial frequency characteristics of the human vision such that the high-frequency characteristics of the amplitude characteristics of the HPF are the opposite characteristics of the spatial frequency characteristics of the human vision.

4. A gradation converting device according to claim 3, further comprising setting means for setting the filter coefficient of the HPF on the basis of the spatial frequency characteristics of the human vision and the resolution of the displaying means.

5. A gradation converting device according to claim 4, wherein the setting means further adjusts the filter coefficient of the HPF according to operation by a user.

6. A gradation converting device that converts gradation of an image, the gradation converting device comprising:
   dither means for applying dither to the image by adding random noise to a pixel value forming the image; and
   one-dimensional ΔΣ modulation means for applying one-dimensional ΔΣ modulation to the image applied with the dither,
   wherein
   the one-dimensional ΔΣ modulation means includes:
   a one-dimensional filter for filtering a quantization error;
   arithmetic means for adding up a pixel value of the image applied with the dither and an output of the one-dimensional filter; and
   quantizing means for quantizing an output of the arithmetic means and outputting a quantized value including the quantization error as a result of the one-dimensional ΔΣ modulation, and
   a filter coefficient of the one-dimensional filter is determined such that high-frequency characteristics of amplitude characteristics of noise shaping performed by the one-dimensional ΔΣ modulation means are opposite characteristics of spatial frequency characteristics of a human vision.

7. A gradation converting device according to claim 6, wherein the filter coefficient of the one-dimensional filter is determined on the basis of characteristics of spatial frequencies equal to or lower than a spatial frequency corresponding to resolution of displaying means for displaying the image applied with the ΔΣ modulation among the spatial frequency characteristics of the human vision such that the high-frequency characteristics of the amplitude characteristics of the noise shaping are the opposite characteristics of the spatial frequency characteristics of the human vision.

8. A gradation converting device according to claim 7, further comprising setting means for setting the filter coefficient of the one-dimensional filter on the basis of the spatial frequency characteristics of the human vision and the resolution of the displaying means.

9. A gradation converting device according to claim 8, wherein the setting means further adjusts the filter coefficient of the one-dimensional filter according to operation by a user.

10. A gradation converting device according to claim 6, wherein
    the one-dimensional filter includes:
    plural delaying means for storing an input to thereby delay the input; and
    multiplying means for multiplying outputs of the plural delaying means and the filter coefficient together, and
    the one-dimensional filter causes, in a horizontal blanking period of the image applied with the dither, the delaying means to keep stored values in the delaying means stored without initializing the stored values.

11. A gradation converting device according to claim 6, wherein
    the one-dimensional filter includes:
    plural delaying means for storing an input to thereby delay the input; and
    multiplying means for multiplying outputs of the plural delaying means and the filter coefficient together, and
    the one-dimensional filter initializes, with a random number, stored values in the delaying means in a horizontal blanking period of the image applied with the dither.

12. A gradation converting method for a gradation converting device that converts gradation of an image, the gradation converting method comprising the steps of:
    applying dither, by use of the gradation converting device, to the image by adding random noise to a pixel value forming the image; and
    applying one-dimensional ΔΣ modulation, by use of the gradation converting device, to the image applied with the dither,
    wherein the gradation converting device has an HPF (High Pass Filter) for filtering a signal, and further comprising filtering the random noise with the HPF, and adding high-frequency components of the random noise obtained as a result of the filtering to the pixel value.

13. A non-transitory computer readable medium having stored thereon a computer program for causing a computer to function as a gradation converting device that converts gradation of an image, the computer program causing the computer to function as:
- dither means for applying dither to the image by adding random noise to a pixel value forming the image; and
- one-dimensional ΔΣ modulation means for applying one-dimensional ΔΣ modulation to the image applied with the dither,
- wherein the dither means has an HPF (High Pass Filter) for filtering a signal, filters the random noise with the HPF, and adds high-frequency components of the random noise obtained as a result of the filtering to the pixel value.

14. A gradation converting device that converts gradation of an image, the gradation converting device comprising:
- a dither unit applying dither to the image by adding random noise to a pixel value forming the image; and
- a one-dimensional ΔΣ modulation unit applying one-dimensional ΔΣ modulation to the image applied with the dither,
- wherein the dither unit has an HPF (High Pass Filter) for filtering a signal, filters the random noise with the HPF, and adds high-frequency components of the random noise obtained as a result of the filtering to the pixel value.

* * * * *